US010503482B2

(12) United States Patent (10) Patent No.: US 10,503,482 B2
Leigh et al. (45) Date of Patent: Dec. 10, 2019

(54) OBJECT MAPPING USING INTRINSIC PERSISTENCE METADATA AND PATTERN-BASED RULES FOR MAPPING TRANSFORMATION

(71) Applicant: Oracle International Corporation, Redwood Shores, CA (US)

(72) Inventors: John Westworth Leigh, Sonoma, CA (US); Kwok Hung Lau, Mountain View, CO (US); Daniel A. Gallagher, Naperville, IL (US)

(73) Assignee: Oracle International Corporation, Redwood Shores, CA (US)

( * ) Notice: Subject to any disclaimer, the term of this patent is extended or adjusted under 35 U.S.C. 154(b) by 733 days.

(21) Appl. No.: 14/866,641

(22) Filed: Sep. 25, 2015

(65) Prior Publication Data

US 2016/0092499 A1 Mar. 31, 2016

Related U.S. Application Data

(60) Provisional application No. 62/056,465, filed on Sep. 26, 2014, provisional application No. 62/056,463, (Continued)

(51) Int. Cl.
*G06F 8/34* (2018.01)
*G06F 8/35* (2018.01)
(Continued)

(52) U.S. Cl.
CPC .................. *G06F 8/34* (2013.01); *G06F 8/20* (2013.01); *G06F 8/35* (2013.01); *G06F 8/38* (2013.01)

(58) Field of Classification Search
CPC .......... G06Q 10/103; G06F 8/34; G06F 8/35; G06F 8/20; G06F 8/38
(Continued)

(56) References Cited

U.S. PATENT DOCUMENTS 6,996,566 B1 * 2/2006 George ............. G06F 17/30607
9,406,044 B2 * 8/2016 Brunswig .............. G06Q 10/10
(Continued)

OTHER PUBLICATIONS

U.S. Appl. No. 14/866,672, Non-Final Office Action dated May 7, 2018, 11 pages.
(Continued)

*Primary Examiner* — Jay A Morrison
*Assistant Examiner* — Ken Hoang
(74) *Attorney, Agent, or Firm* — Kilpatrick Townsend & Stockton LLP

(57) ABSTRACT

The present disclosure relates generally to a data integration system that may provide techniques for capturing definitions from business entities and how the business entities are implemented in a set of tables. This enables the data integration system to transform a data flow defined using business entities into code that may be used to transform the underlying tables and columns. Additionally to generate tables, classes and APIs to provide persistence of and manipulation for the definitions of these business entities. Additionally to dynamically generate a GUI editor for an object model of arbitrary complexity while maintaining GUI usability. This reduces development time and supports editing of an arbitrary object model. A dynamically generated GUI may be generated from an object model definition that is received from a user and/or is derived from the user's code.

18 Claims, 21 Drawing Sheets

Related U.S. Application Data filed on Sep. 26, 2014, provisional application No. 62/083,122, filed on Nov. 21, 2014.

(51) Int. Cl.
 *G06F 8/20* (2018.01)
 *G06F 8/38* (2018.01)

(58) Field of Classification Search
 USPC ................ 707/803, E17.044, 779, E17.005, 707/E17.016, 754, 760, 765, 999.102, 707/E17.127, 759, 769, 999.1, 999.101, 707/E17.032, E17.108, E17.13, 636, 637, 707/640, 646, 655, 661, 662, 664, 702, 707/711, 713, 722, 737, 741, 755, 770, 707/794, 797, 805, 807, 810, 822, 827, 707/954, 999.01, 999.103, 999.104, 707/999.107, 999.202; 709/225, 217, 709/219, 223, 224, 226, 227, 229, 231, 709/235, 202, 204, 213, 228, 238, 246; 706/20, 47, 12, 16, 50; 705/50, 51, 7.11, 705/7.38, 1.1, 30, 311, 35, 36 R, 37, 57, 705/7.12, 7.15, 7.16, 7.17, 7.22, 7.28, 705/7.36, 7.37, 7.39, 7.41, 7.42
 See application file for complete search history.

(56) References Cited

U.S. PATENT DOCUMENTS

| 9,418,127 | B2* | 8/2016 | Xiong ............... G06F 17/30563 |
| 2004/0015858 | A1* | 1/2004 | Seto ........................ G06F 9/449 717/120 |
| 2004/0210607 | A1* | 10/2004 | Manchanda ...... G06F 17/30592 |
| 2007/0074167 | A1 | 3/2007 | Cohrs et al. |
| 2009/0089746 | A1 | 4/2009 | Rigolet |
| 2011/0035354 | A1* | 2/2011 | Wan .................. G06F 17/30557 707/602 |
| 2016/0092049 | A1 | 3/2016 | Leigh et al. |

OTHER PUBLICATIONS

U.S. Appl. No. 14/866,672, Final Office Action dated Nov. 29, 2018, 15 pages.

* cited by examiner

Example of Schema / Class generation

```
//Dimension Business Type definition
BusinessType{
  name="Dimension"
  supertype="NamedClass"
  isTopLevel=true
  BusinessItems={
    (BusinessProperty{name="bindingType", type="String"}),
    (BusinessProperty{name="deletePolicy", type="String"}),
    (BusinessProperty{name="loadInvalidParentKeyOption", type="string"}),
    (BusinessProperty{name="loadNullParentKeyOption", type="String"}),
    (BusinessTypeUse{name="levels", target="Level", cardinalityType="ORDERED_COLLECTION", isInternal=true, isOwned=true}),
    (BusinessTypeUse{name="hierarchies", target="Hierarchy", cardinalityType="ORDERED_COLLECTION", isInternal=true, isOwned=true}),
    (BusinessTypeUse{name="dimSequence", target="Sequence", cardinalityType="SINGLE", isInternal=false, isOwned=false}),
    (BusinessTypeUse{name="dimTable", target="DataObject", cardinalityType="SINGLE", isInternal=false, isOwned=false}),
    (BusinessTypeUse{name="dimErrorTable", target="DataObject", cardinalityType="SINGLE", isInternal=false, isOwned=false})
  }
}
```

Resulting Repository Table Definition

```
ODI_DIMENSION
ID                           NOT NULL NUMBER(19)
NAME                         NOT NULL VARCHAR2(400)
DESCRIPTION                  CLOB
BINDING_TYPE                 VARCHAR2(1)
DELETE_POLICY                VARCHAR2(1)
LOAD_INVALID_PARENT_KEY_OPTION  VARCHAR2(1)
LOAD_NULL_PARENT_KEY_OPTION  VARCHAR2(1)
I_DIM_SEQUENCE               NUMBER(19)
I_DIM_TABLE                  NUMBER(19)
I_DIM_ERROR_TABLE            NUMBER(19)
```

Resulting Class Signature Example

```
OdiDimension
    getID
    getName
    getDescription
    getBindingType
    getDeletePolicy
    getLoadInvalidParentKeyOption
    getLoadNullParentKeyOption
    getLevels
    getHierarchies
    getDimSequence
    getDimTable
    getDimErrorTable
    setID
    setName
    setDescription
    setBindingType
    setDeletePolicy
    setLoadInvalidParentKeyOption
    setLoadNullParentKeyOption
    setLevels
    setHierarchies
    setDimSequence
    setDimTable
    setDimErrorTable
    addLevel
    addHierarchy
    removeLevel
    removeHierarchy
```

622 { (getID ... getDimErrorTable)
624 { (setID ... setDimErrorTable)
626 { (addLevel ... removeHierarchy)

```
# master layout
Layout = \
    page.Definition,\
        heading.Binding,\
        heading.OrphanManagement,\
    page.Levels,\
        heading.LevelAttributes,\
        heading.ApplicationKeyMembers,\
        heading.ParentLevelReferences,\
    page.Hierarchies regular controls
Each line has a comma-separated list of information for one control:
# 1. container (a page or a heading) in which this control is contained
# 2. order of this control within that container
# 3. type of this control: TEXTFIELD,TEXTAREA,COMBO,RADIO
Dimension_Name.layout                   = page.Definition,0,TEXTFIELD
Dimension_Description.layout            = page.Definition,1,TEXTAREA
Dimension_ImplementationType.layout     = page.Definition,2,RADIO
Dimension_BoundTable.layout             = heading.Binding,0,COMBO
Dimension_BoundErrorTable.layout        = heading.Binding,1,COMBO
Dimension_BoundSequence.layout          = heading.Binding,2,COMBO
Dimension_InvalidParentOption.layout    = heading.OrphanManagement,0,RADIO
Dimension_NullParentOption.layout       = heading.OrphanManagement,1,RADIO
Dimension_OrphanRemovalOption.layout    = heading.OrphanManagement,2,RADIO
Level_BoundTable.layout                 = 0,0,COMBO
Level_BoundErrorTable.layout            = 0,0,COMBO
Level_BoundStagingTable.layout          = 0,0,COMBO
Level_SurrogateKeyAttribute.layout      = 0,0,COMBO tables
Dimension_Levels.layout                 = page.Levels
Level_LevelAttributes.layout            = heading.LevelAttributes
Level_ApplicationKeyMembers.layout      = heading.ApplicationKeyMembers
Level_ParentRefs.layout                 = heading.ParentLevelReferences,0
ParentRef_RefMembers.layout             = heading.ParentLevelReferences,1
Dimension_Hierarchies.layout            = page.Hierarchies,0
Hierarchy_HierMembers.layout            = page.Hierarchies,1
HierarchyMember_SkipLevels.layout       = page.Hierarchies,2 pages (translations)
page.Definition = Definition
page.Levels = Levels
page.Hierarchies = Hierarchies headings (translations)
heading.Binding = Binding
heading.OrphanManagement = Orphan Management Settings
heading.LevelAttributes = Level Attributes
heading.ApplicationKeyMembers = Application Key Members
heading.ParentLevelReferences = Parent Level References
```

*FIG. 13D*

OBJECT MAPPING USING INTRINSIC PERSISTENCE METADATA AND PATTERN-BASED RULES FOR MAPPING TRANSFORMATION

RELATED APPLICATIONS

This application claims benefit under 35 U.S.C. § 119(e) to: U.S. Provisional Patent Application No. 62/056,465, filed Sep. 26, 2014; U.S. Provisional Patent Application No. 62/056,463, filed Sep. 26, 2014; and U.S. Provisional Patent Application No. 62/083,122, filed Nov. 21, 2014; the disclosures of which are incorporated by reference herein in their entirety for all purposes.

Further, the present application is related to commonly owned U.S. patent application Ser. No. 14/866,672 filed Sep. 25, 2015, and entitled, "GENERIC EDITOR LAYOUT USING INTRINSIC PERSISTENCE METADATA," the disclosure of which is incorporated by reference herein in their entirety for all purposes.

BACKGROUND

An object model can be used to describe semantics governing a business concept. This may include its structure, including attributes and relationships to other dependent or related concepts. An object may generally refer to a data structure used to either store or reference data. Using the object model, various object instances may be instantiated and/or persisted.

Conventional approaches to object models do not adequately address the needs of users. Today, users have to understand the transforms required to populate and maintain objects and determine what data structures need to have which transforms applied to them to achieve desired results. Maintain and modifying object models and objects may be a complicated undertaking requiring specialists or specially trained technicians and administrators. The necessity to use specially trained technicians and administrators may increase costs and/or increase delays.

Thus, there is a need for improvements so that such situations may be addressed. This and other needs are addressed by the present disclosure.

BRIEF SUMMARY

Certain embodiments of the present disclosure relate generally to data migration, and in particular to systems and methods for object mapping using intrinsic persistence metadata and pattern-based rules for mapping transformation.

Techniques are provided to transform business-level mapping of object models into data-level mapping of object models. This is accomplished by capturing definitions from business entities and determining how the business entities are implemented in a set of tables. This enables the data integration system to transform a data flow defined using business entities into code that may be used to transform the underlying tables and columns. Techniques are provided for capturing rules to dynamically define the shape used to represent a business entity in the mapping editor. The rules may be stored as a smart component. Embodiments define how the smart component is expanded to generate implementation level dataflow that manipulates the actual objects that provide the implementation of the business entity. Thus, embodiments reduce development time and provide editing and mapping support for an object model.

In one aspect, a method is provided, which method may include any one or combination of the following. An object model received by a data-processing system may be processed. The object model may define a plurality of objects and a first set of rules governing relationships among the plurality of objects. The object model may be analyzed by the data-processing system to determine a first set of metadata from the object model. The first set of metadata may specify the plurality of objects in the object model and the first set of rules governing relationships among the plurality of objects. The object model may be analyzed by the data-processing system to determine a second set of metadata that specifies instantiations of objects of the plurality of objects in one or more data structures and a second set of rules governing the objects in the one or more data structures. Based at least in part on the first set of metadata and the second set of metadata, code may be dynamically generated by the data-processing system to facilitate a representation of the object model in a mapping with a smart component. The smart component may be configured to persist and to manipulate the instantiations of objects of the plurality of objects in the one or more data structures based at least in part on the second set of rules governing the objects in the one or more data structures.

In yet another aspect, one or more non-transitory, processor-readable media storing instructions that, when executed by a data-processing system, cause the data-processing system to perform any one or combination of the following. An object model received by the data-processing system may be processed. The object model may define a plurality of objects and a first set of rules governing relationships among the plurality of objects. The object model may be analyzed to determine a first set of metadata from the object model. The first set of metadata may specify the plurality of objects in the object model and the first set of rules governing relationships among the plurality of objects. The object model may be analyzed to determine a second set of metadata that specifies instantiations of objects of the plurality of objects in one or more data structures and a second set of rules governing the objects in the one or more data structures. Based at least in part on the first set of metadata and the second set of metadata, code may be dynamically generated to facilitate a representation of the object model in a mapping with a smart component. The smart component may be configured to persist and to manipulate the instantiations of objects of the plurality of objects in the one or more data structures based at least in part on the second set of rules governing the objects in the one or more data structures.

In another aspect, a system is provided. The system may include a data-processing system that includes one or more processors communicatively coupled to a data store. The data-processing system may further include memory coupled to the one or more processors and storing instructions that, when executed by the one or more processors, cause the data-processing system to perform any one or combination of the following. An object model received by the data-processing system may be processed. The object model may define a plurality of objects and a first set of rules governing relationships among the plurality of objects. The object model may be analyzed to determine a first set of metadata from the object model. The first set of metadata may specify the plurality of objects in the object model and the first set of rules governing relationships among the plurality of objects. The object model may be analyzed to determine a second set of metadata that specifies instantia- tions of objects of the plurality of objects in one or more data structures and a second set of rules governing the objects in the one or more data structures. Based at least in part on the first set of metadata and the second set of metadata, code may be dynamically generated to facilitate a representation of the object model in a mapping with a smart component. The smart component may be configured to persist and to manipulate the instantiations of objects of the plurality of objects in the one or more data structures based at least in part on the second set of rules governing the objects in the one or more data structures.

In various embodiments, services for the object model may be generated. The services may include one or more of a set of tables, one or more class definitions, one or more class relationships, and/or one or more application programming interfaces. The smart component may use the services to persist and to manipulate the instantiations of objects of the plurality of objects in the one or more data structures.

In various embodiments, the object model may be represented as the smart component based at least in part on at least one pattern definition associated with the object model, where the at least one pattern definition may define one or more mapping expansion rules for expanding the mapping of the object model. In various embodiments, the at least one pattern definition may further include one or more expansion rules associated with the smart component, wherein the one or more expansion rules define how to generate one or more data transformations to manipulate the instantiations of objects of the plurality of objects in the one or more data structures.

In various embodiments, based at least in part on the first set of metadata a graphical user interface editor for the object model may be dynamically generated. In various embodiments, user input received based at least in part on the graphical user interface editor for the object model may be processed, where the user input indicates a change to the object model. The smart component may manipulate the instantiations of objects of the plurality of objects in the one or more data structures based at least in part on the user input. In various embodiments, the smart component may manipulate the instantiations of objects of the plurality of objects in the one or more data structures based at least in part on the one or more mapping expansion rules for expanding the mapping of the object model.

The techniques described above and below may be implemented in a number of ways and in a number of contexts. Several example implementations and contexts are provided with reference to the following figures, as described below in more detail. However, the following implementations and contexts are but a few of many.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the following appended figures.

FIGS. 6A and 6B illustrates examples of a schema/class generation, repository table definition, and resulting class signature, in accordance with certain embodiments of the present disclosure.

FIGS. 13A-13D show examples a dynamically generated graphical user interface (GUI), in accordance with an embodiment of the present invention.

Figure 1:
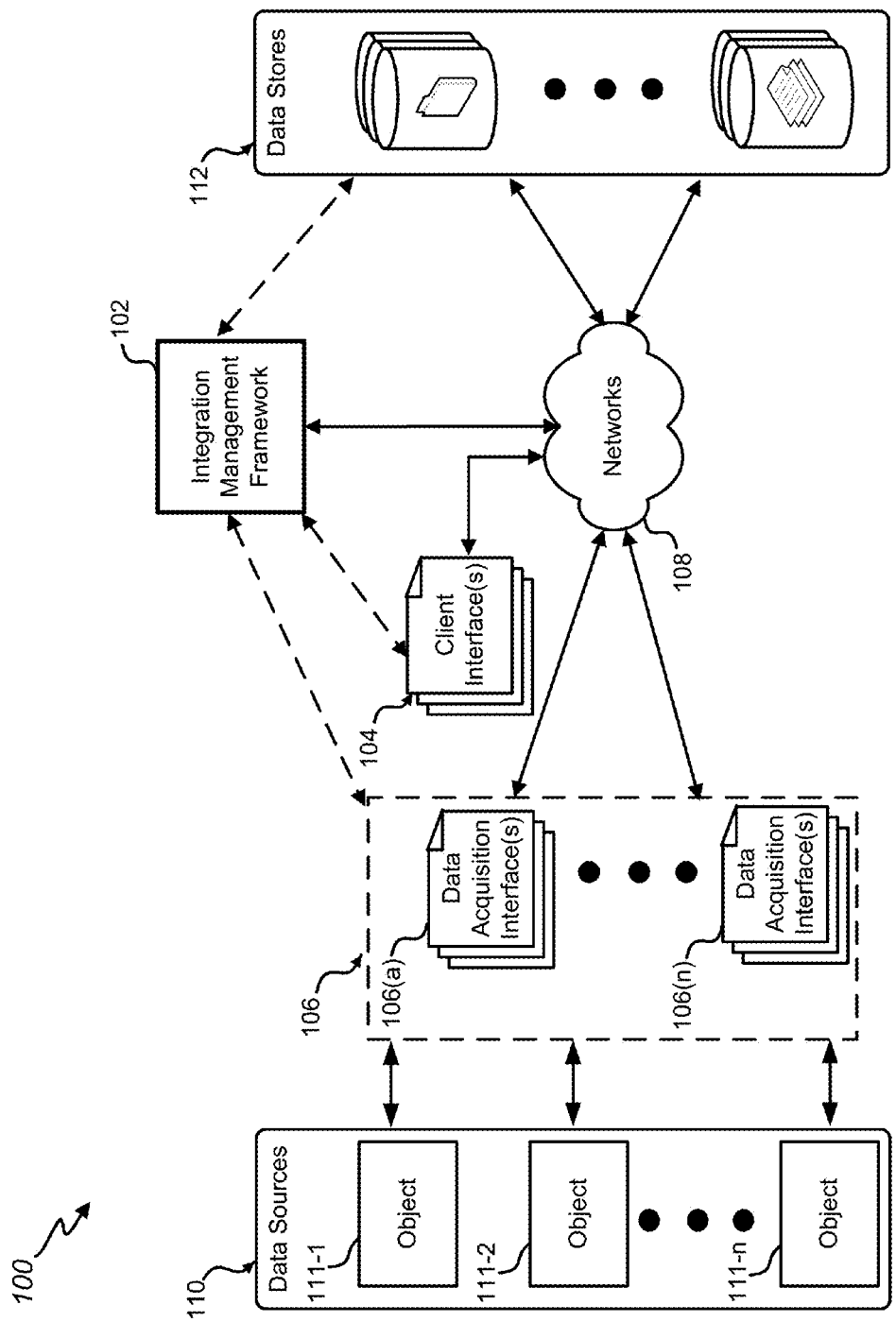
FIG. 1 depicts a high-level block diagram of a data integration system, in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims. Systems depicted in some of the figures may be provided in various configurations. In some embodiments, the systems may be configured as a distributed system where one or more components of the system are distributed across one or more networks in a cloud computing system.

An object model can be used to describe the semantics governing a business level concept. This may include its structure including attributes and relationships to other dependent or related concepts. Further the model can capture the rules of how instances of this business concept (objects) are actually implemented in the physical structures (e.g., tables). Today, users have to understand the transforms required to populate and maintain these business objects and manually determine what columns/tables need to have which transforms applied to them to achieve the equivalent results. This metadata (if captured in a structured form that then becomes accessible to the system) along with related patterns (that describe the rules for visualizing concepts of this nature as logical objects in a dataflow mapping, plus the rules for expanding the logical object mapping into a dataflow that manipulates the underlying physical structures) allow users to describe their transformation requirements at the logical level without the need to be concerned with the real implementation. This allows business level users to better contribute to and define the required dataflow mappings. This metadata can also be used to drive the GUI design required to maintain the business object definitions.

In various embodiments, a data integration system enables users to create a logical design which is platform and technology independent. The user can create a logical design that defines, at a high level, how a user wants data to flow between sources and targets. Data integration system tool can analyze the logical design, in view of the user's infrastructure, and create a physical design. The logical design can include a plurality of components corresponding to each source and target in the design, as well as operations such as joins or filters, and access points. Each component when transferred to the physical design generates code to perform operations on the data.

In one aspect, the data integration system may enable users to define data integration mappings at a business entity level. Mappings are the logical and physical organization of data sources, targets, and the transformations through which the data flows from source to target. The ability to describe business level concepts and to design mapping using these concepts is a desirable feature with various advantages. For example, the user does not need to designate underlying tables or other data representations to define the mappings. This simplifies the design and development process and enables more users of varying skillsets (e.g., business users, developers, and other users) to be involved in the development process.

Certain embodiments according to present disclosure may provide techniques to dynamically generate a graphical user interface (GUI) for an object model of arbitrary complexity while maintaining GUI usability. This reduces development time and supports editing of an arbitrary object model. In some embodiments, the dynamically generated GUI may be generated from an object model definition received from a user. In some embodiments, the object model may be derived from the user's code by, for example, an object model generator module. Subsequently, the GUI may be dynamically generated based on the derived object model.

Upon receiving the object model from the user or the object model generator module, the object model may be analyzed to extract persistence metadata from the object model. In some embodiments, the metadata may be extracted using data provided in a configuration file associated with the object model or using additional data such as annotations and naming conventions associated with the object model. The metadata may be used to generate a GUI layout. According to various embodiments, capabilities such as create, read, update and delete (CRUD) actions for the objects in the object model may be provided through user interface (UI) controls incorporated in the generated GUI without additional manual coding.

In some embodiments, the extracted metadata may include a list of persistent fields associated with one or more objects of the object model. The extracted metadata may also include relationships between the objects in the object model. For example, the extracted metadata may include one or more of a one-to-many ownership relationship, a one-to-one ownership relationship, or a one-to-one reference relationship. These relationships may be rendered on the GUI using UI controls, such as a table control, a dropdown box, a textbox, a text field, a radio button and the like.

In certain embodiments, techniques (including methods, systems, code or software instructions executed by one or more processors) are provided for receiving, by a generic editor framework, an object model. The object model may be received from a user. Alternatively, the object model may be received from an object model generator of the generic editor framework. The object model generator may generate the object model based on a user-provided code. The object model may define a plurality of objects. The plurality of objects may include a first class object and at least one second class object such that a relationship between the first class object and the at least one second class object is a one-to-many ownership relationship. In some embodiments, a first class object can own zero or more second class objects through either one-to-one ownership relationship or one-to-many relationship.

The generic editor framework may analyze the object model to extract metadata from the object model. The metadata may describe the plurality of objects of the object model and relationships among the plurality of objects of the object model. The generic editor framework may dynamically generate a graphical user interface editor for the object model based on the metadata. In some embodiments, the graphical user interface editor may be generated by a graphical user interface generation module of the generic editor framework such that the graphical user interface generation module is compatible with a plurality of object models including the received object model. The object model may be manipulated by editing instances of the object model via the graphical user interface editor.

In some embodiments, the generic editor framework may identify a configuration file associated with the object model and extract the metadata based on data included in the configuration file. Yet in other embodiments, the generic editor framework may identify additional data incorporated within the object model and extract the metadata based on the additional data. The additional data may include annotations and pre-determined naming convention(s) used in the object model.

In some embodiments, the metadata may include one or more of a plurality of fields storing primitive values, a one-to-many ownership relationship among the plurality of objects, a one-to-one ownership relationship among the plurality of objects, a one-to-one reference relationship among the plurality of objects, and an extension relationship among the plurality of objects. The one-to-one reference relationship may be rendered as a dropdown box in the graphical user interface editor and the one-to-many ownership relationship may be rendered as a table control in the graphical user interface editor.

Moreover, the metadata may be used to generate user interface controls in the graphical user interface editor, the user interface controls including a table control, a dropdown box, a textbox, a text field or a radio button. In some embodiments, the graphical user interface editor may include user interface controls to create, remove or reorder the plurality of objects based on the relationships among the plurality of objects.

FIG. 1 depicts a high-level block diagram of a data integration system 100, in accordance with certain embodiments of the present disclosure. The system 100 may allow for interaction between two or more of an integration management framework 102, client interfaces 104, data acquisition interfaces 106, and/or data stores 112. In some embodiments, the data stores 112 may correspond to a data warehouse, and the data integration framework 102 may correspond to a warehouse manager. As depicted, components of the system 100 may be communicatively coupled or couplable to one or more networks 108. The data integration system 100 may include one or more data sources 110 communicatively coupled to an integration management framework 102 via data acquisition interface(s) 106 and/or network(s) 108. One of ordinary skill in the art will appreciate that the data integration system 100 may include more or less components than those shown in FIG. 1.

In some embodiments, the data integration framework 102 may be executing locally on a client interface 104, or remotely on a server that communicates with one or more client interfaces 104. The client interfaces 104 and/or data acquisition interfaces 106 may allow for transfer of and access to information in accordance with certain embodiments disclosed herein. In various embodiments, the client interface(s) 105 and/or data acquisition interface(s) 106 may include one or more suitable input/output modules and/or other system/devices operable to serve as an interface between end users and the integration management framework 102. In various embodiments, the integration management framework 102 may include, provide, and/or be configured for operation with the client interfaces 104 and/or data acquisition interfaces 106, for example, by making available and/or communicating with one or more of a website, a web page, a web portal, a web application, a mobile application, enterprise software, and/or any suitable application software. In some embodiments, a client interface 104 and/or data acquisition interface 106 may include an API to interact with the integration management framework 102.

In some embodiments, a client interface 104 and/or a data acquisition interface 106 may include a web interface. In some embodiments, the client interface 104 and/or data acquisition interface 106 may include or work with an application made available to one or more interfaces, such as a mobile application. In some embodiments, the client interface 104 and/or data acquisition interface 106 may cause a web page to be displayed on a browser. The web page(s) may display output and receive input from a user (e.g., by using Web-based forms, via hyperlinks, electronic buttons, etc.). Accordingly, the interaction processing infrastructure 102 may have web site(s)/portal(s) enable access to such information. In certain embodiments, a client interface 104 and/or a data acquisition interface 106 may include a computing device of an end user (e.g., workstation, desktop, laptop, tablet, or other local computer system). In some embodiments, the data acquisition interface 106 may be the client interface 104.

The one or more data sources 110 and one or more target data stores 112 may store data using data structures. An object 111 may generally refer to a data structure used to store and/or reference data. An object model may define objects 111 and their relationships. In some embodiments, an object model may model a real-world entity, such as a customer or a purchase order in a database or other data structure. Using the object model, various object instances may be instantiated and/or persisted. In some embodiments, object models may be associated with object-oriented features such as variable-length arrays and nested tables that provide higher-level ways to organize and access data in the database or other data structure. Underneath the object layer, data may be stored, for example, in columns and tables, but users may be able to work with the data in terms of the real-world entities, such as customers and purchase orders.

In some embodiments, an object model may be stored in a database in a multidimensional form. The data associated with the object model may be categorized by dimensions. Dimensions may contain a set of unique values that identify and categorize data. Dimensions may form the edges of a cube. For example, a Sales measure contained in a cube may have four dimensions: Time, Customer, Product, and Channel. A particular Sales value (e.g., 43,613.50) in the Sales cube may have meaning when it is qualified by a specific time period (e.g., Feb-06), a customer (e.g., XYZ Systems), a product (e.g., Portable Computers), and a channel (e.g., Catalog).

Figure 2:
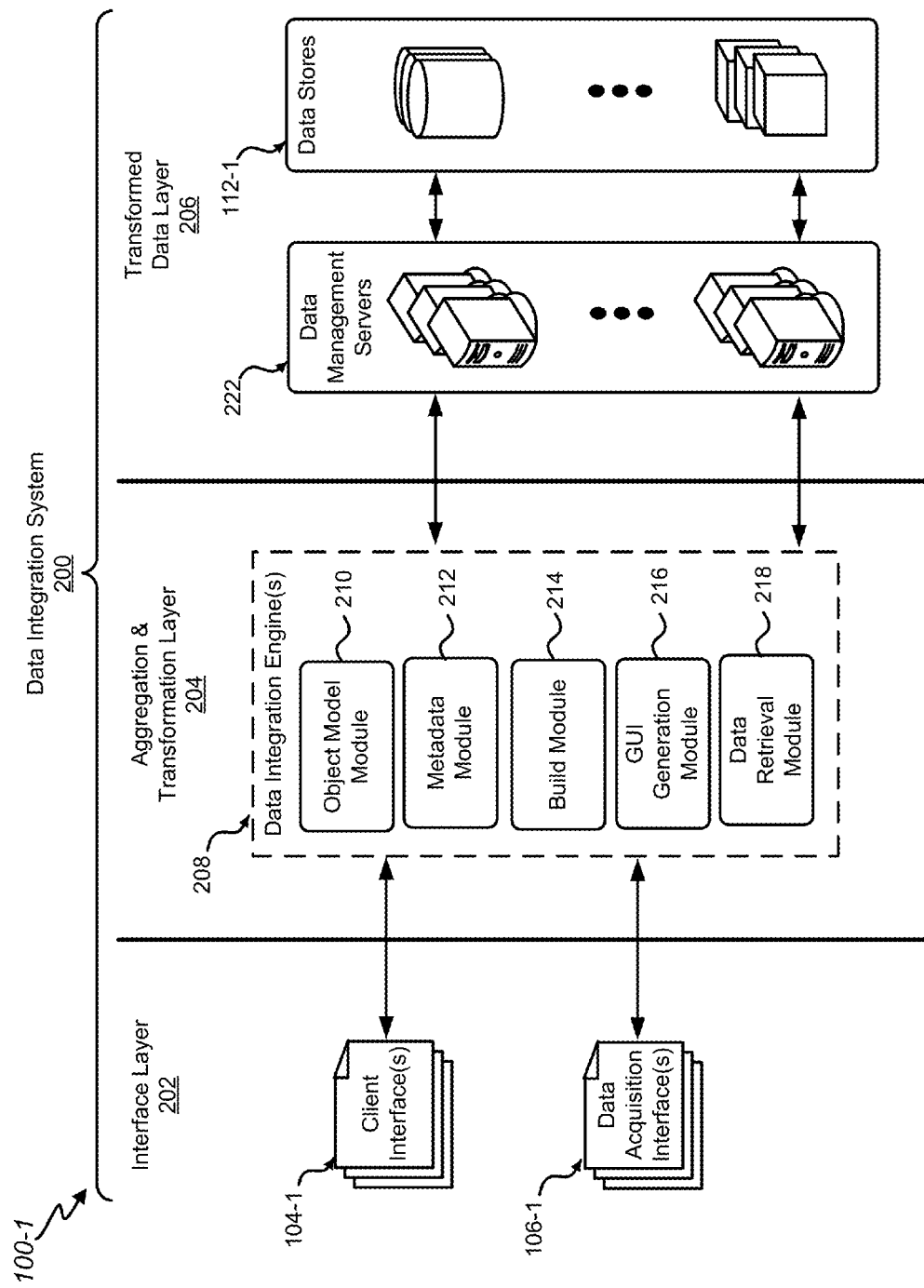
FIG. 2 shows a diagram of the data integration system, in accordance with certain embodiments of the present disclosure.

FIG. 2 shows a diagram of the data integration system 100-1, in accordance with certain embodiments of the present disclosure. As depicted, in some embodiments, the data integration system 100-1 at least partially includes an interface layer 202, an aggregation and transformation layer 204, and a transformed data layer 206. Other embodiments may have different demarcations. The interface layer 202 may include the client interface 104 and/or the data acquisition interface 106. The data integration framework 102 may include the aggregation and transformation layer 204. In some embodiments, the data integration framework 102 may further include the interface layer 202 and/or the transformed data layer 206.

Data integration processes may be defined using a data integration engine 208, which may include or otherwise correspond to a data integration application. In some embodiments, the data integration processes may be defined using the data integration application. For example, the data integration engine 208 may define particular transforms and other operations to be performed on one or more data sources and may define one or more target data stores 112 to which the results of the transforms and other operations are to be loaded. In some embodiments, a local data integration repository may store data representing the data integration processes (e.g., metadata). The data integration engine 208 may generate code that, when executed, will perform the particular transforms and other operations. The aggregation and transformation layer 204 may include one or more modules, such as an object model module 210, a metadata module 212, a build module 214, a GUI generation module 216, and data retrieval module 218. In various embodiments, one or more of the modules may be included in the data integration engine 208 or may be separate from the data integration engine 208.

The data integration engine 208 may be configured with the data retrieval module 218 to retrieve data via the client interface 104 and/or the data acquisition interface 106. For example, objects 111 may be retrieved from data sources 110. In some embodiments, information serving as at least a partial basis for object models or otherwise relating to object models may be retrieved.

Object models may vary greatly, and a new GUI needs to be created (e.g., coded) specifically for a given object model. However, a GUI generation module 216 provided in the data integration framework 102 may be used to dynamically generate a GUI for an object model. In various embodiments, object models may be received via a client interface 104 and/or received from an object model generation module 210 which generates the object model based at least in part on user code and/or based at least in part on the object model generation module 210 analyzing objects from the data sources. The metadata module 212 may analyze the object model and extract metadata from the object model. The metadata extraction module 212 may pass the metadata to the GUI generation module 216 to dynamically generate a custom GUI for the object model, without any foreknowledge of the object model.

In some embodiments, a build module 214 may include a pattern module that may maintain one or more patterns that may transform business level mappings to data level mappings which may be used to generate the data integration code. In some embodiments, the build module 214 may include a table/class generation module. Based on an object model and related metadata definitions, the table/class generation module may generate persistence schema and related APIs to persist and maintain instances of the object model (e.g., the metadata). In some embodiments, the build module 214 may be configured to perform transformations of data disclosed herein. The transformation may include data aggregation, data validation, data correction, data consolidation such as redundancy handling/deletion, conflict resolution, and/or the like. For example, one or more of objects 111 may be transformed to conform to mappings, persistence instantiations, and manipulations disclosed herein. Further, one or more of objects 111 may be transformed to conform to database schemas for data stores 112 that are managed by data management server(s) 222.

In some embodiments, the data integration engines 208, which may or may not correspond to a data integration application in various embodiments, may enable definition of data integration mappings at the level of a business entity (e.g., Customer, Channel, Product dimension, Sales cube). The underlying data representations corresponding to the business entities may be used to generate data integration code that may perform the defined mappings.

In some embodiments, the object model may be provided to the metadata module 212, which may analyze the object model and extract metadata associated with the object model. The metadata may be provided in the classes as annotations, using naming conventions or in a property file (e.g., a configuration file) associated with the object model. In some embodiments, the configuration file may be provided by the user. For example, if the object model is received from a user, the user may have generated the object model using a pre-determined naming convention. This way, the metadata module 212 may recognize the naming convention and extract the metadata from the object model. In some embodiments, for example in the absence of a pre-determined naming convention, the user may include annotations in the object model or in the code representing the object model. The metadata module 212 may recognize the annotations and extract the metadata from the object model. In some embodiments, when the user did not use a pre-determined naming convention and/or annotations, the user may provide a configuration file associated with the object model. The configuration file may allow the metadata module 212 to extract the metadata from the object model. In embodiments where the configuration file is provided along with the pre-determined naming convention and/or the annotations, the configuration file may take precedence over the pre-determined naming convention and/or the annotations.

Once the exemplary persistence metadata regarding an object and its relationship with other objects is extracted, the metadata may be used by the GUI generation module 216 to generate a generic GUI. The metadata may include a list of persistent fields that store primitive values (int, String, etc.) associated with an object, a persistent one-to-many ownership relationship among objects, a persistent one-to-one ownership relationship among objects, and a persistent one-to-one reference relationship among objects. According to various embodiments, the object model may include a first class object and a second class object. The first class object and the second class object may be referred as the parent class and the child class. The object of the parent class may own one or more objects of the child class through the one to-many ownership relationship. A persistent one-to-many ownership relationship may be ordered. Moreover, a class may be extended from another class. The first class may be called the base class, while the second class may be called the derived class.

Based on the exemplary metadata discussed above, a generic GUI may include a table control to represent a persistent one-to-many ownership relationship, with the objects on the "many" side displayed as rows in the table control. Any persistent one-to-one reference relationship may be displayed as a dropdown box in the GUI where the referenced object may be selected in the dropdown box. Any persistent fields of an object (e.g., a first class object) may be displayed as a UI control (e.g., textbox, text field, radio button, and the like) which may be configured based on the metadata and/or in response to instructions received from a user, developer, or other system. Any persistent fields or one-to-one reference relationships of objects (e.g., second class objects) may be displayed as table columns in the respective table control. The generated GUI may be further configured so that the various UI controls (e.g., table control, textbox, text field, radio button) may be laid out in a particular order, and be arranged in tabs and/or under collapsible headings. The order of the fields or relationships in the table control may be customized as well. In some embodiments, contents of a table control may be automatically refreshed based on a selection in another (e.g., related) table control. The various UI controls may be connected to the appropriate methods in the corresponding classes to perform operations (e.g., create, read, update, delete) on the object model. The connection may be undertaken based on pre-determined naming conventions, annotations, and/or a configuration file associated with the object model.

Using the data integration framework 102, each generated GUI may be initialized with an editor model class which defines the GUI layout and GUI handlers for metadata retrieval and actions for each first class object. A generic GUI model may be created to provide GUI layout and metadata manipulation for any objects. However, for the generic GUI model to perform appropriate actions, the generic editor may infer the metadata operations that are available from objects for each primitive field or relationship. The method of the object models may either be implemented using a pre-determined naming convention, or additional annotations may be added to the fields or relationships in the class of the object model. In the cases where certain method of the object models do not conform to the pre-determined naming convention and no annotations are found in the classes of the object model, a specific editor model class that extends from the generic GUI model may be implemented to provide the required methods for the generic editor code. Alternatively, a general metadata framework may be provided to capture and provide the metadata. In general, the method in the specific editor model class may have the highest precedence and may be used to perform the action if the action is defined. The method described in the annotation of the field or the relationship in the class of the object model may be searched next, followed by the method in the class of the object model that conforms to the pre-determined naming convention. If none of the methods are found, such action may be assumed to be not supported for that field or relationship.

Figure 3:
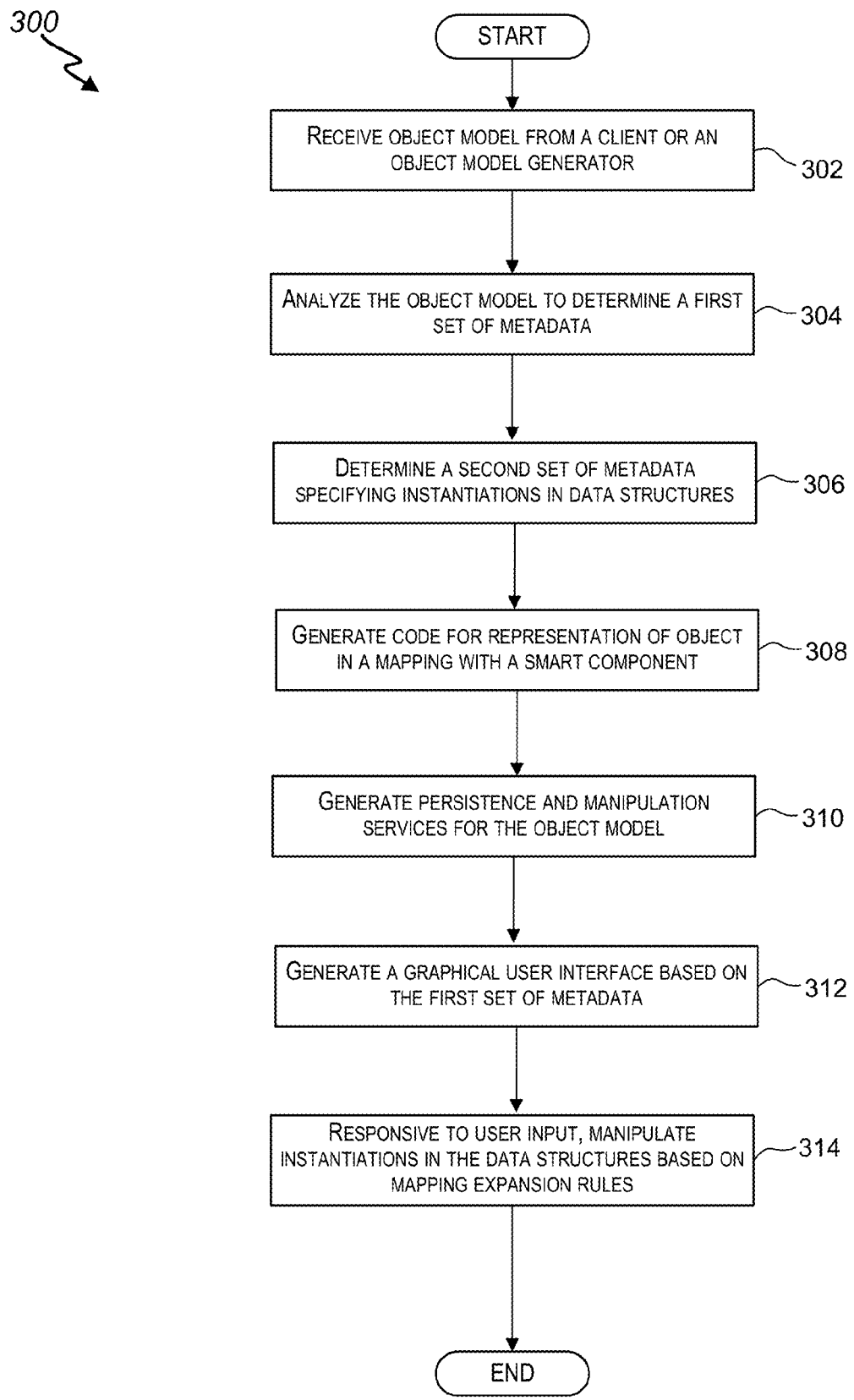
FIG. 3 illustrates an example of an object model, in accordance with certain embodiments of the present disclosure.

FIG. 3 illustrates an example method 300, in accordance with certain embodiments of the present disclosure. The example method 300 may correspond to a high-level representation of certain aspects that are disclosed in further detail herein. Teachings of the present disclosure may be implemented in a variety of configurations that may correspond to systems described herein. As such, the order of the steps comprising the method 300 and/or the other methods disclosed herein may be shuffled in any suitable manner and may depend on the implementation chosen. Moreover, while the steps of the method 300 and/or the other methods disclosed herein may be separated for the sake of description, it should be understood that certain steps may be performed simultaneously or substantially simultaneously. According to some embodiments, the method 300 may begin as indicated by 302.

As indicated by block 302, an object model may be received. The object model may be received by the system 102, and the object model may define a plurality of objects and a first set of rules governing relationships among the plurality of objects. As indicated by block 304, the object model may be analyzed to determine a first set of metadata from the object model. The first set of metadata may specify the plurality of objects in the object model and the first set of rules governing relationships among the plurality of objects. In some embodiments, the first set of metadata is extracted from the object model. In some embodiments, part of the first set of metadata is extracted from the object model, and part of the first set of metadata is derived by the system 102 based at least in part on the extracted metadata.

As indicated by block 306, a second set of metadata may be determined. The second set may specify instantiations of objects of the plurality of objects in one or more data structures and a second set of rules governing the objects in the one or more data structures. As indicated by block 308, based at least in part on the first set of metadata and the second set of metadata, dynamically generating code to facilitate a representation of the object model in a mapping with a smart component. The smart component may be configured to persist and to manipulate the instantiations of objects of the plurality of objects in the one or more data structures based at least in part on the second set of rules governing the objects in the one or more data structures.

As indicated by block 310, persistence and manipulation services for the object model may be generated. In some embodiments, the services may include one or more of a set of tables, one or more class definitions, one or more class relationships, and/or one or more application programming interfaces. As indicated by block 312, based at least in part on the first set of metadata, a graphical user interface editor for the object model may be dynamically generated.

As indicated by block 314, user input received based at least in part on the graphical user interface editor for the object model may be processed, where the user input indicates a change to the object model. The smart component may manipulates the instantiations of objects of the plurality of objects in the one or more data structures based at least in part on the user input and on one or more mapping expansion rules for expanding the mapping of the object model. Further details regarding aspects of the method 300 are disclosed in reference to various embodiments herein.

Figure 4:
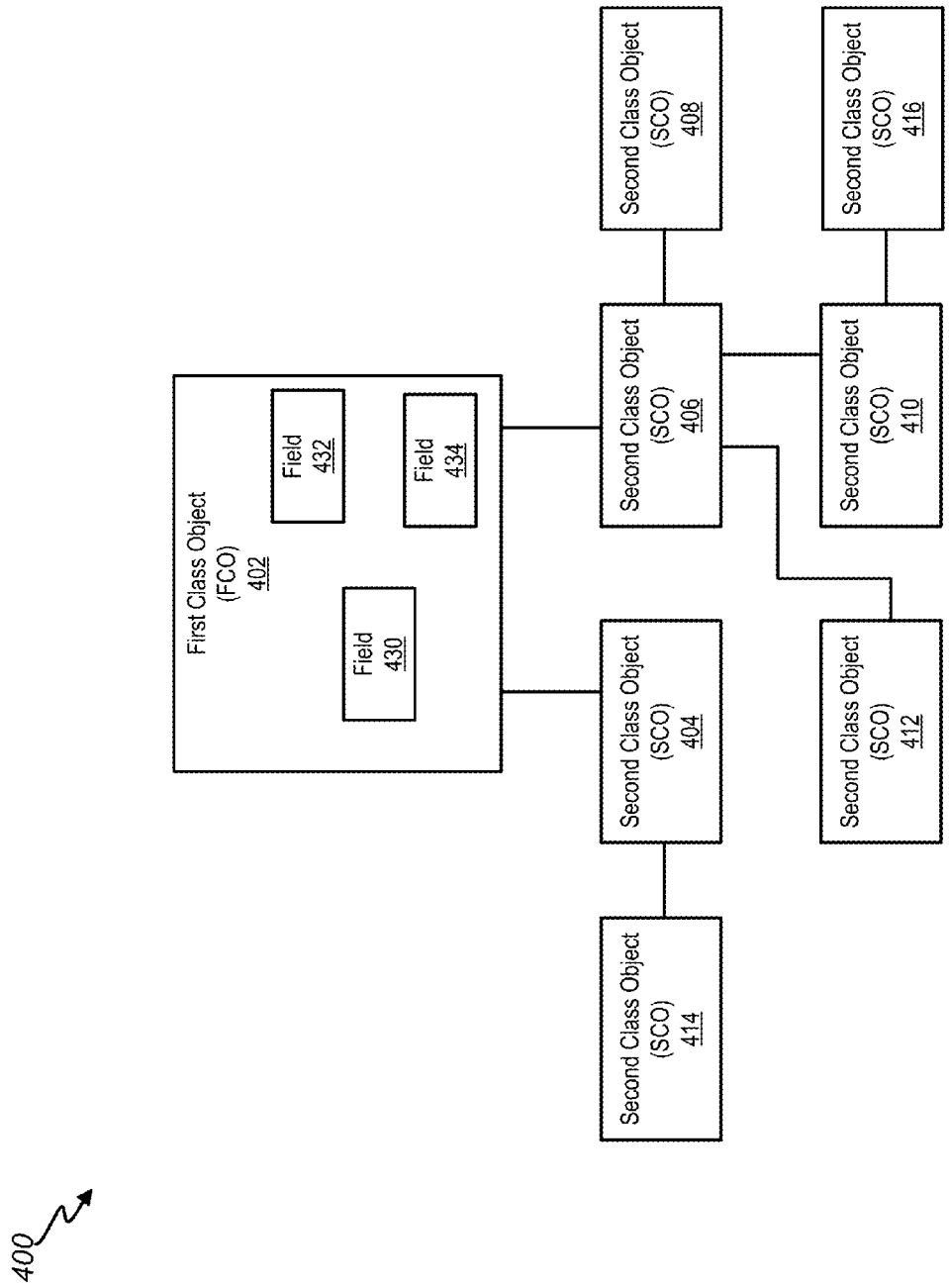
FIG. 4 illustrates another example of an object model, in accordance with certain embodiments of the present disclosure.

FIG. 4 illustrates an example of an object model 400, in accordance with certain embodiments of the present disclosure. In some embodiments, an object model 400 may include a first class object (FCO) 402 and at least one second class object (SCO) 404, 406, 408. An editor (e.g., a GUI) may be used to edit an object model which is defined at the FCO level. An FCO may be the object that a user considers the top-level object for a "unit of work." Examples of FCOs in the data integration context may include objects like Mapping, Package, Table, etc. An FCO may include other objects which are called second class object (SCOs), such as Mapping Components or Columns.

In some embodiments, metadata may be extracted from the object model 400 and used to dynamically generate and layout a GUI. The metadata may include, one or more classes in the model, e.g., a list of persistent fields that store primitive values (int, String, etc.), persistent one-to-many ownership relationship(s) with another class (e.g., FCO 402 and SCO 404 may be referred to as a parent class and a child class where the object of the parent class "owns" one or more objects of the child class through the one-to-many ownership relationship), a persistent one-to-one ownership relationship with another class, a persistent one-to-one reference relationship to another class, and/or other relationships between classes in the model (e.g., one class (i.e. the derived class) may be extended from another class (i.e. the base class)). In some embodiments, this metadata may be extracted using a pre-determined naming convention, through one or more annotations and/or through a property file.

The object model 200 shown in FIG. 4 includes a first class object (FCO) 402 and seven second class objects (SCO) 404, 406, 408, 410, 412, 414, 416. The SCO 404 includes two SCOs, SCO 412 and SCO 414. The SCO 406 includes two SCOs, SCO 408 and SCO 412. The SCO 410 includes one SCO, SCO 416. The relationship between the FCO 402 and the SCO 406 is a persistent one-to-many ownership relationship. The relationship between SCO 406 and SCO 408 is a persistent one-to-one reference relationship. The FCO 402 may include various persistent fields 430, 432, 434, such as bindingType (Implementation Type: Star or Snowflake), deletePolicy (Delete Parent), loadInvalidParentKeyOption (Load Invalid Parent) and loadNullParentKeyOption (Load Null Parent). Additional visual cues may be used to represent these relationships. In some embodiments, the one or more of the SCOs 404, 406, 408, 410, 412, 414, 416 may include one or more fields, such as persistent fields.

Figure 5:
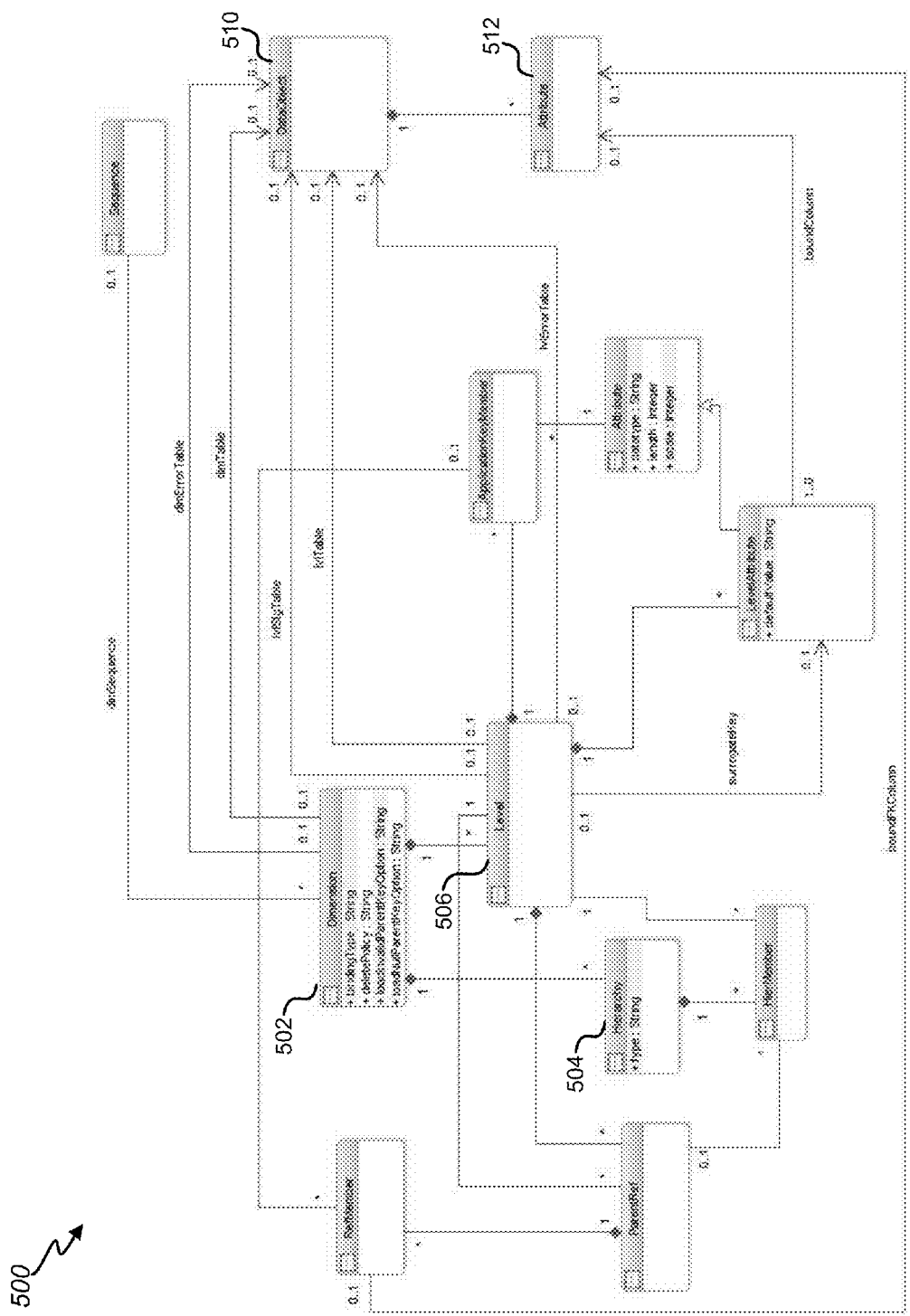
FIG. 5 illustrates another example of an object model, in accordance with certain embodiments of the present disclosure.

FIG. 5 illustrates another example of an object model 500, in accordance with certain embodiments of the present disclosure. In the object model 500, the dimension object 502 is the FCO of the object model. The object model 500 also includes two second class objects: hierarchy object 504 and level object 506. The classes Sequence 508, DataObject 510 and Attribute 512 may not be a part of the dimension object 502. Rather, the classes Sequence 508, DataObject 510 and Attribute 512 are references from the object model 500 to these classes.

The dimension object 502 may be a business entity. A business entity may support the definition of instances conforming to a business type. A business entity may include an object that is the realization or instantiation of a business type. For example, a set of business types representing a dimension can be defined and a business entity can be created based on the said business types to represent a dimension instance. A business entity may be used to wrap around an actual physical realization such that a different data shape can be presented. A shape that is more familiar to the business user can be presented regardless of the actual implementation used. For dimensions, this could be a star table or something more complex, such as a snow flake set of database tables or even a multi-dimensional storage.

A business type may be a simple structure, such as a set of columns, or it could be a complex shape made up of a mix of columns, other business types or arrays thereof. The business type may be used to capture the rules relating to a type of object and the semantics underlying its structure. Binding rules may define how a business entity, e.g., the dimension object 502, may be implemented via one or more datastores. In some embodiments, bindings may include the objects that instantiate a business entity and link it to the physical tables in the metadata. For example, a dimension implemented as a star table would be bound to the underlying table, and its LevelAttributes would be bound to the columns of the DataObject. With bindings, the patterns and business types provide ETL functionality. Attributes in the business entity need not be bound to the columns in the table that provide the persistence.

The rules for the binding may be defined as part of the BusinessType details, which approach, for example, may be used to capture the binding information for the relational implementations. An example of a complex type would be a business type, SCD (Slowly Changing Dimension) that stores and manages both current and historical data over time in a data warehouse, that includes all the semantics for how a dimension is structured including how the SCD characteristics are defined, and a resulting business entity might be the "Product" dimension that leverages Type 2 SCD for the lowest level in the "Product Standard" hierarchy. For a simple case, the business type might describe how three columns comprise the "currency" type; base currency, transaction_date, base currency cost. An example business entity might be "Purchase Cost" that could be a derived attribute in the PURCHASE_ITEMS table/view. In some embodiments, the FCO may be given to the persistence generator of the engine 208 (which may correspond to the build module 214 in some embodiments) to generate a set of tables, classes and APIs to provide a persistence and maintenance service for instances of that object model.

FIGS. 6A and 6B illustrates examples of a schema/class generation 600, repository table definition 610, and resulting class signature 620, in accordance with certain embodiments of the present disclosure. FIG. 6A shows a business type definition 602 of the dimension class corresponding to the dimension object 502 shown in FIG. 5. Based on business type definition 602, the repository table definition 610 for the dimension object 502 may be generated. The repository table definition 610 may specify how dimension objects are physically implemented as tables. FIG. 6B shows an example of class signature 620 that may be automatically generated to manipulate instances of the dimension object 502. The class signature 620 may include "getter" methods 622 and "setter" methods 624 for each attribute defined in repository table definition 610 and methods 626 to add and remove level and hierarchy objects related to the dimension object 502. Additional details regarding business type definitions are provided herein.

Focusing more now on pattern-based rules for mapping transformation, techniques are provided for capturing definitions from business entities and determining how the business entities are implemented in a set of tables. This enables the data integration system 110 to transform a data flow defined using business entities (e.g., business level mapping) into code that may be used to transform the underlying tables and columns (e.g., data level mapping).

In some embodiments, data integration application 208 may enable users to define business level mappings without requiring the user to define the mappings at the data level. Instead, the integration management framework 112 may automatically transform the business level mapping into a data level mapping using a pattern associated with the business entities. The data level mapping may be used to generate data integration code. The mapping may be anything from a collection of columns that always needs to be transformed in a common way when moving between platforms, from lookups for transforming a code to a string, to complex structural transformations involving full rowset conversions.

In some embodiments, object definition may include rules (business types) that describe how business entities are defined. Object definition may also include definitions of business entity instances (e.g., a product dimension and a sales cube or who data and currency data) and binding rules that indicate how the business types (e.g., dimensions/cubes) are implemented as datastores (e.g., tables or which columns constitute the who data or currency data.)

Figure 7:
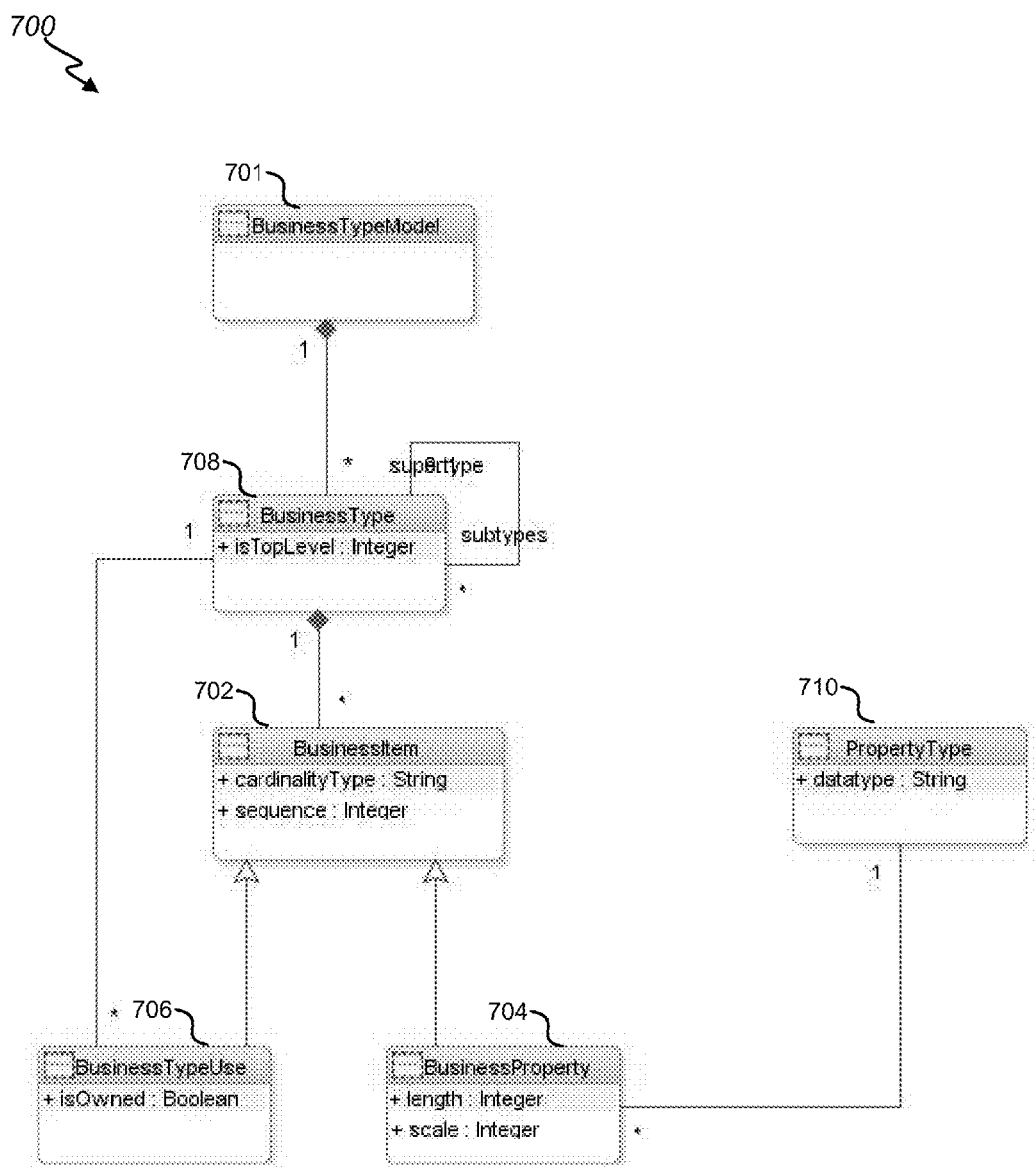
FIG. 7 illustrates an example framework for a business type model, in accordance with an embodiment of the present disclosure.

FIG. 7 illustrates an example framework 700 for a business type model 701, in accordance with an embodiment of the present disclosure. The framework 700 for the business type model 701 may define structural rules that govern a definition of Business Entities. Considering the dimensional case, a set of classes may be defined in a meta model that describe the structural rules of a dimension and cube. The container for that definition may be a meta meta model. The business type model 700 may play the role of the meta meta model in this example. The meta model may include Classes, Properties, and Associations (concepts in the meta meta model).

The business type model 700 may include business items 702 which may be simple properties (Business Properties) 704 or complex sub-structures (Business Type Uses) 706. In the exemplary business type model 700, the BusinessType 708 plays the role of a class, BusinessItems 702 are the properties of the BusinessType 708. The BusinessItems 702 are sub-divided into BusinessProperty 704 and BusinessTypeUse 706. The BusinessProperty 704 is the property corresponding to PropertyType 710, and the BusinessTypeUse 706 is the association.

A validation service may be associated with the business type model 700 to ensure that BusinessTypeUses 706 and BusinessProperties 704 are uniquely named across the inheritance chain. A business type model 700 may be as simple or complex as necessary. On the one hand, the business type model 700 may be used to represent a complete structure such as a dimension. Or the business type model 700 may define how a simple set of attributes collectively represent a concept such as audit data or currency amount. For example, multiple table columns in the underlying database table may be used to represent an invoice amount. A business attribute of business type Currency may be created to wrap around those columns. Creating business type instances may be thought of as realizing a class model of the structure. Business types may include specialized business types that depend on (or extend from) more general business types.

Figure 8:
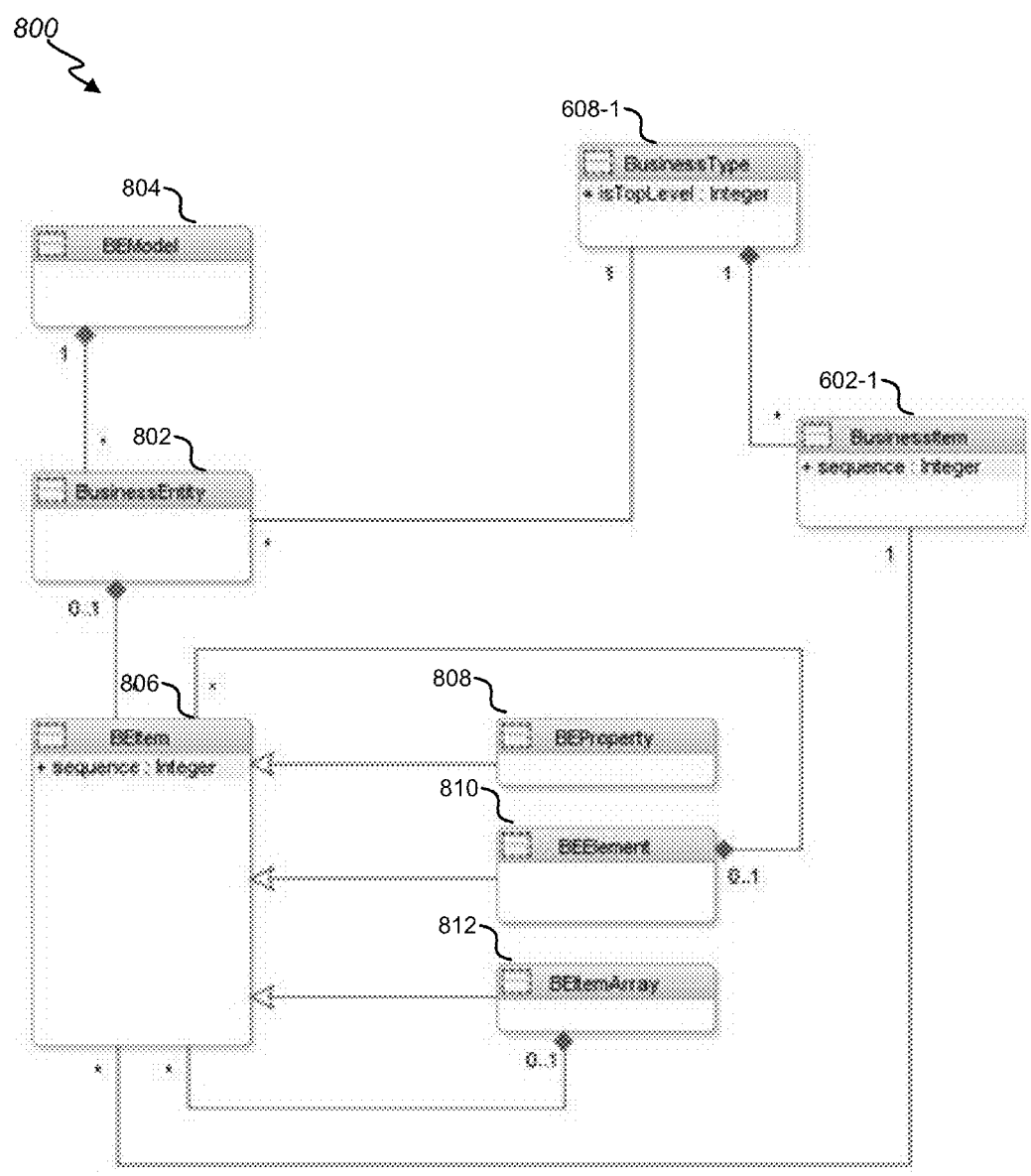
FIG. 8 illustrates an example storage schema for a business entity, in accordance with certain embodiments of the present disclosure.

FIG. 8 illustrates an example storage schema 800 for a business entity 802, in accordance with certain embodiments of the present disclosure. A business entity 802 is an object that is the realization or instantiation of a business type 708 associated the a business entity model 804. Business entities 802 may be used to create instances of business types 708. In FIG. 8, an instance of the business type "Dimension" may be stored using a dimension class whose structure is generated based on the business type 708. In addition to the business entity definition, it may also include the details of how this "logical" object is physically implemented in some set of tables and columns. As illustrated by the example depicted, a set of business types 708 representing a dimension can be defined, and a business entity 802 can be created based on the business types 804 to represent a dimension instance including BEItem(s) 806 with BEProperty 808, BEElement 810, and BEItemArray 812 specifications. Persistence of business entities 802 may be provided by a dynamic extensibility framework.

With certain embodiments, new entities may be dynamically defined, and existing entities may be extended by means of an entity metadata definition. This approach may allow for easy, dynamic definition of new business entity 802 using the same framework. Further, this approach may allow existing entities to be extended by subclassing the existing entities. This approach may also allow provision of "native" support for the new entities. The new SDK classes generated by this framework adhere to the native SDK architecture supported by existing classes. Still further, all entities may be represented naturally as schematized tables in the table repository. For example, one entity with 11 simple attributes becomes a row with 11 columns, not 11 rows in a table of name-value pairs. This assures that entities can be easily and quickly located by their attribute values without complicated joins.

Figure 9:
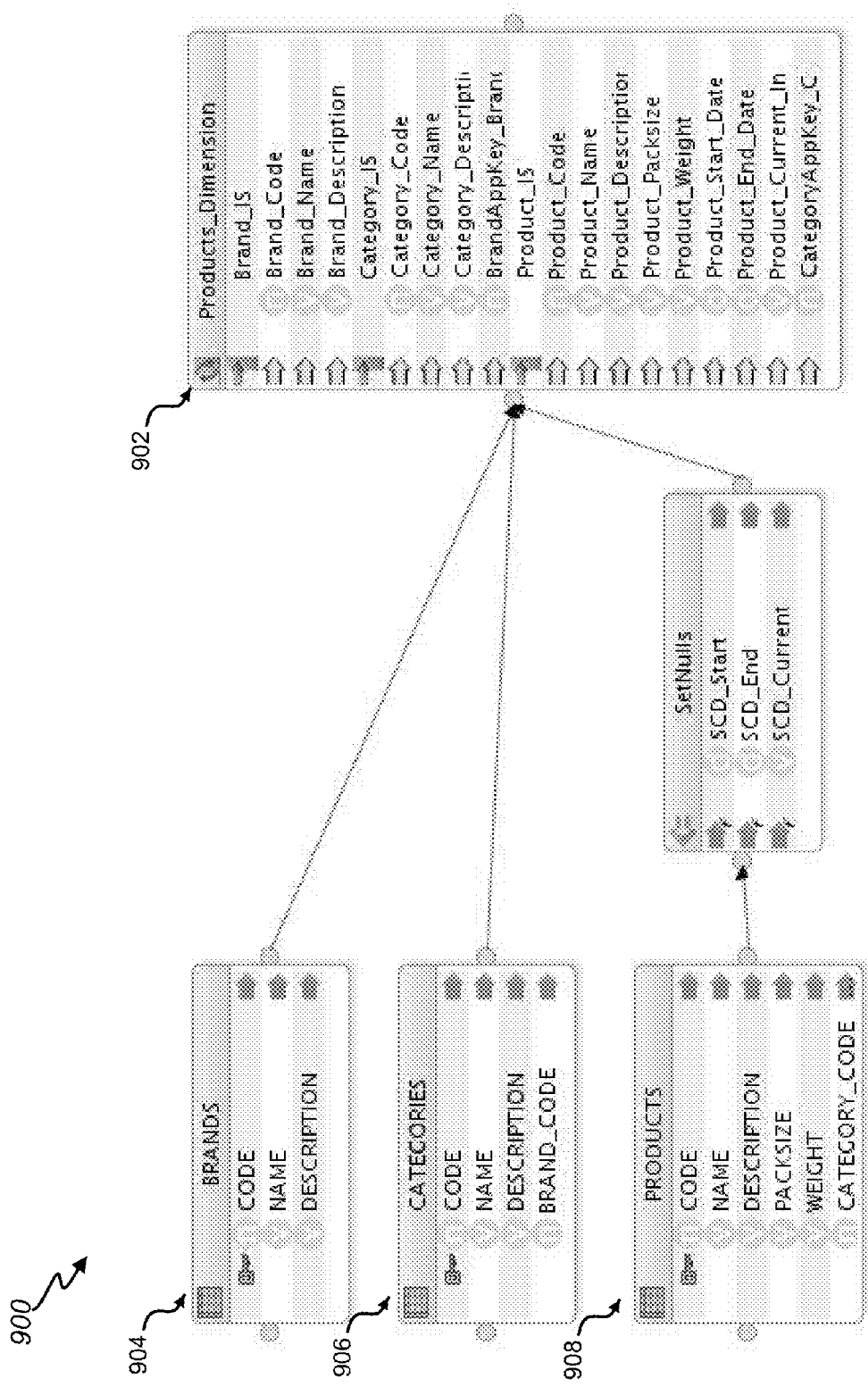
FIG. 9 illustrates an example of an entity level mapping, in accordance with an embodiment of the present disclosure.

FIG. 9 illustrates an example of an entity level mapping 900, in accordance with an embodiment of the present disclosure. Some embodiments may provide visual support in mapping for complex objects, which may have sub-objects. The entity level mapping 900 may represent a product dimension in a mapping. As the dimension has three levels, depicted is a component 902 with three input groups 904, 906, 908 (connector points) each representing a level. The entity level mapping 900 shows how the attributes for each level are being sourced from various data objects. While the example is a fairly simple one, any set of data flows could be used to source each level.

The entity level mapping 900 may employ patterns that are associated to business types and that define the mapping rules associated with them. As with business types, these may include the rules for looking up a textual status and returning a code, through to rules for how to load a complex structure such as a dimension from several sources and how that translates into loading the tables underlying the conceptual dimension. In some embodiments, a pattern may define rules of how a data structure component will be expanded into a form that actually manipulates the real objects underlying the business entity.

In some embodiments, a pattern is represented in a mapping via a smart component. A smart component, similar to other component types used in mapping, may be used in a mapping and has input and/or output connectors which in turn may have attributes associated with them. A difference with a smart component may include that the connector points and attributes are calculated, rather than predefined, based on rules in the pattern. A smart component may expand into a set of other components, but rather than being a predefined graph, the graph may be generated according to rules defined in the pattern. In some embodiments, any object model may be represented as a smart component based on at least one pattern definition associated with the object model. The pattern definition(s) associated with a particular object model may define one or more mapping expansion rules for that object model.

As such, in some embodiments, a pattern is a set of rules that define how an instance of a business type (a business entity) exposes its shape to the mapping design. The pattern may define how many connector points/attributes the smart component representing this business entity should contain. The pattern may define how the structure within a smart component will be expanded to generate the mapping design underlying the component that will actually satisfy the business level mapping represented by the smart component itself.

When a pattern is applied to a business level mapping, the end result is a graph that includes the transformations required to achieve the desired data manipulation language (DML) on the real objects (e.g., data level objects) underlying the logical concepts (e.g., business level objects) that the user actually references in their high level mapping. It is this resultant graph which is used in code generation to produce the ELT scripts that will be deployed and executed.

In some embodiments, a smart component may include a set of rules (tied to the object concept of Cube or Dimension) that, given a specific instance of that concept (such as the Product Dimension), would create an instance of the smart component that would have the shape of the bound object (Product Dimension). It would also generate an expanded graph (sub-graph) that is the real implementation of the smart component given the rules and a specific shape. These smart components have a dependency on the capability to define these logical objects and show how they are implemented as tables or other types of data objects.

Salient parts of the mapping framework may include 1) a representation of the business entity in a mapping and 2) an expansion of that logical construct into a mapping that manipulates the underlying objects that realize that logical construct. This may be dependent on the nature of the business object. For attribute level business objects, they may be seen as any other attribute. It is the transforms that reference the business entity (as source or target) that drive the code expansion. For object level business entities, they may become components (smart components) in the mapping. In these cases, the pattern defines the rules for how the smart component must be expanded to generate the underlying components that are needed to drive the code generation.

Some embodiments may employ multiple patterns that could be used to govern how data is loaded to or read from a type of business entity. Some embodiments may determine which pattern should be used where more than one is available. In some embodiments, which pattern to use may be pre-defined, e.g., which of the available patterns should be used for a business entity instance may be defined at the business entity instantiation. In some embodiments, a user prompt may be generated to query a user which pattern should be used. In some embodiments, one or more user-selectable options for pattern choice from among available options may be presented. For example, one or more user-selectable options may be presented as part of the business entity definition (e.g., the Product BE defines which of the available patterns it is associated with), when the component is dropped into a mapping, and/or as supported by a pattern. Some embodiments may automatically determine which pattern should be used, without user specification. For example, some embodiments may identify a type of entity and match the type of entity to a particular pattern based at least in part on a characteristic of the type of entity and/or pattern.

Figure 10:
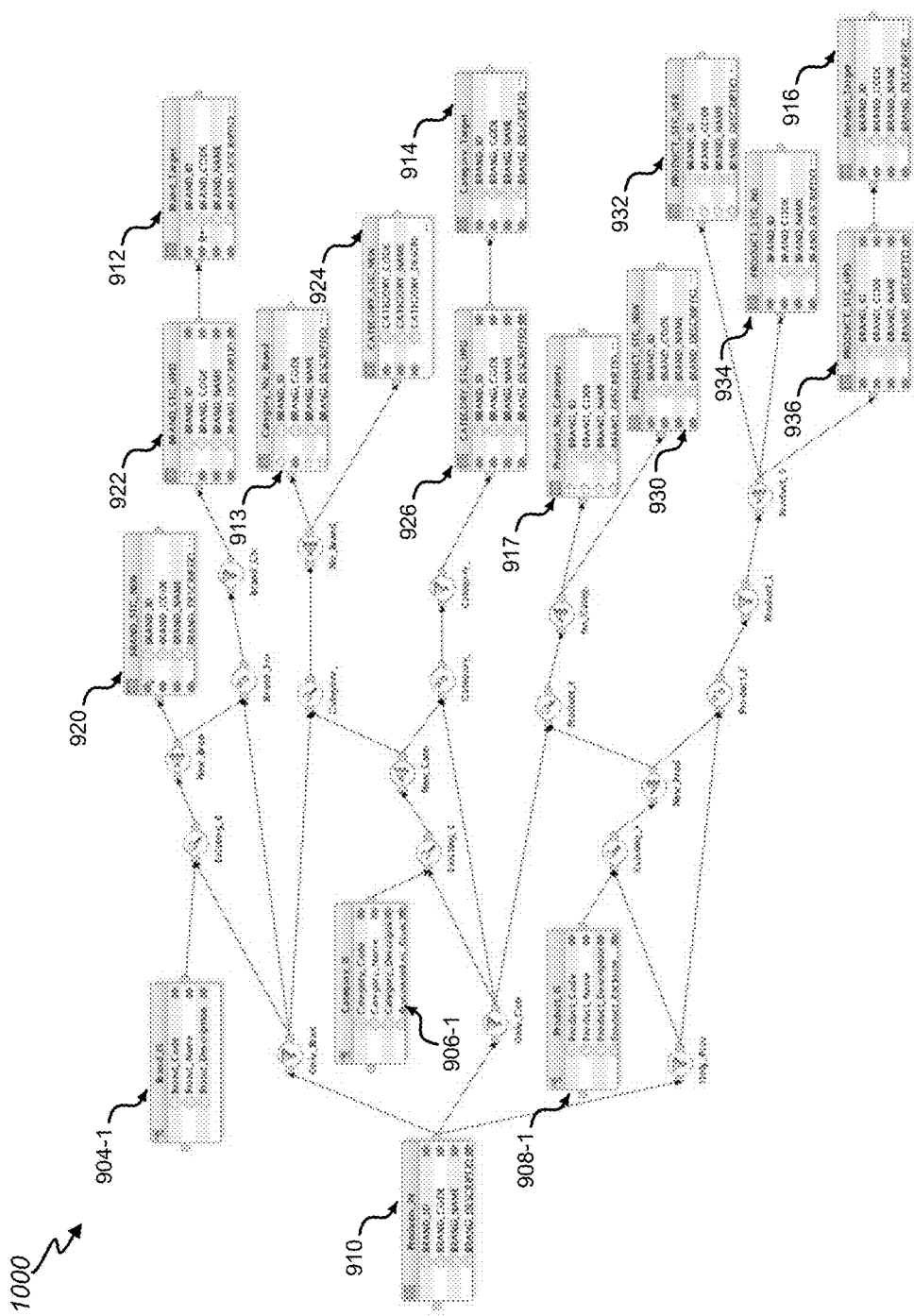
FIG. 10 illustrates an example data level mapping based on the entity level mapping using a pattern, in accordance with an embodiment of the present disclosure.

FIG. 10 illustrates an example data level mapping 1000 based on the entity level mapping 900 using a pattern, in accordance with an embodiment of the present disclosure. As discussed herein, a pattern may describe the rules that control how to convert the business level mapping into a data object level mapping. The data level mapping 1000 may be an example of the expanded form of a product dimension load mapping. The expanded form may be generated based on a pattern. In some embodiments, the pattern may be defined as a script and leveraged a mapping SDK, a data object SDK, and a dimension SDK, generated from a business type definition.

As in the example depicted, the data level mapping 1000 may include the brand table 904, the category table 906, and the product table 908 used as input in the main mapping. The data level mapping 1000 may further include a main dimensional table 910. The main dimensional table 910 may be used as input to determine whether updates and/or inserts are performed, along with identifying errors, using the brand table 904, the category table 906, and the product table 908. The data level mapping 1000 may further include target data stores 912, 913, 914, 916, 917. The target data stores 912, 913, 914, 916, 917 may be part of the same bound object. The data level mapping 1000 may further include temporary storage tables 920, 922, 924, 926, 928, 930, 932, 934, 936 for temporary storage, used multiple times for each level.

At a high level, the mapping may be enable a dimension component which would be a type of smart component. In some embodiments, the rules for generating the smart component may be based at least in part on the one or more of following. The smart component (<dimension name>_Dimension) may be built based at least in part on the dimension object particulars injected into the mapping. A connector point for each level may be built based at least in part on the load hierarchy. In the depicted example, the naming corresponds to <level name>_IS. For each attribute in the level, an attribute may be generated (excluding any surrogate key attribute). For each parent reference for this level, an attribute may be created for each key member in the application key of the parent level. In the above example, the ID columns are the surrogate keys and the Code columns are the application keys for each level. The parent reference attribute names may be generated as <parent reference name>_<parent application key attribute name>, e.g., in Product it is CategoryAppKey_Category_Code.

In some embodiments, the rules for generating the smart component may be based at least in part on one or more of the following. A data object component may be built (<dimension name>_IN) for the table implementing the dimension. The name of the table may be in the dimension binding object. The connector points for each level may be built based at least in part on the load hierarchy. For each attribute in the level, an attribute may be generated, excluding any surrogate key attributes. For each parent reference for the level, an attribute may be created for each key member in the application key of the parent level. A filter may be built to produce only those rows from <dimension name>_IN that represent the set of members for the level. An analysis may be performed to determine if input rows match to existing rows. If so, it may be determined if there are any changes. And, if that level is SCD2 and any of those changes are part of the history triggering, the existing row may be closed, a new row may be opened, and/or the existing may be updated. In the case of new rows, the parents may be verified to be valid. Upon verification, a new row(s) may be created. Otherwise, error messages may be written.

Figure 11:
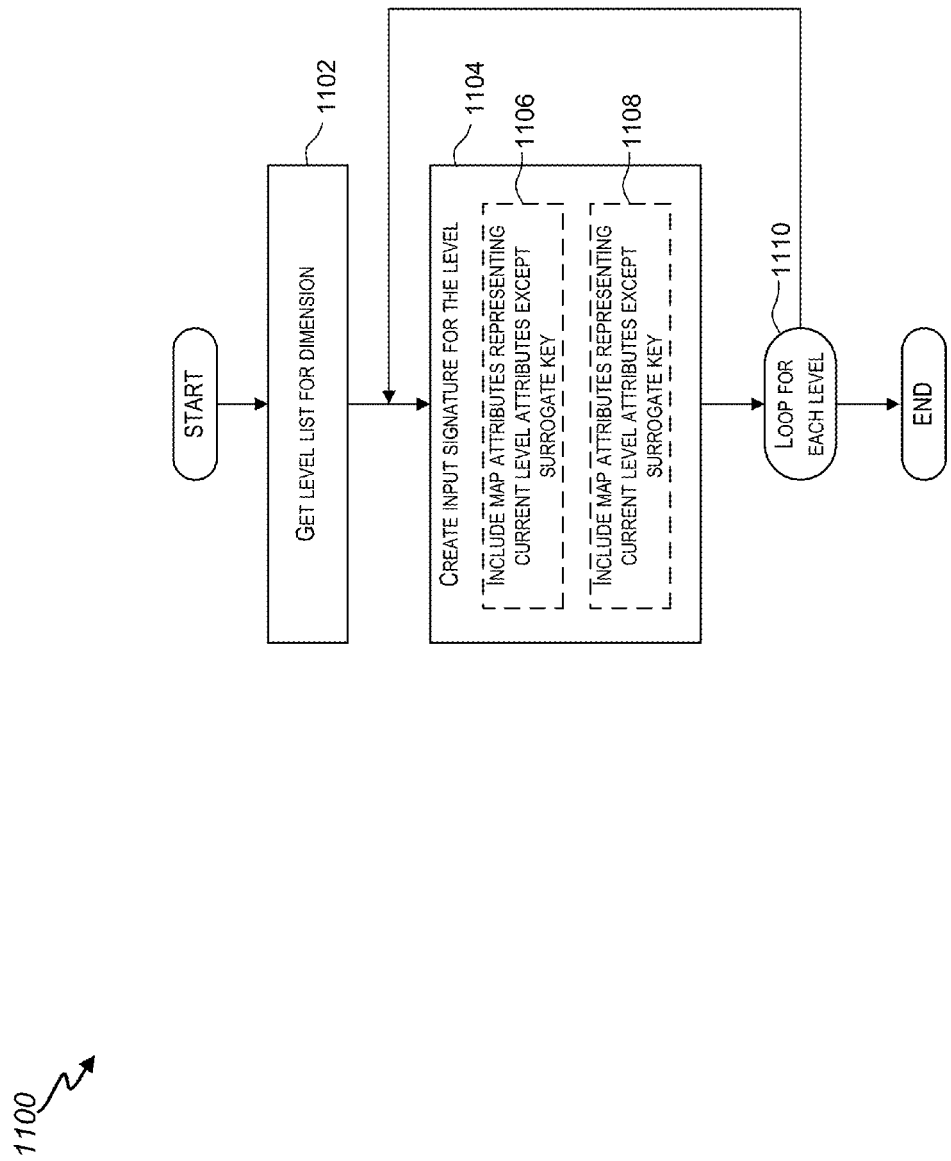
FIG. 11 illustrates an example pattern that defines how a business entity signature may be created in a mapping, in accordance with an embodiment of the present disclosure.

FIG. 11 illustrates an example pattern that defines how a business entity signature may be created in a mapping, in accordance with an embodiment of the present disclosure. As shown in FIG. 11, a method 1100 may be used to traverse each instance of dimension and determine a level list for that instance of dimension. As indicated by block 1102, the level list for the dimension may be retrieved. The level list may include level objects related to that dimension object (e.g., second class level objects to the first class dimension object. As indicated by block 1104, for each level object in the level list, an input signature may then be created.

As indicated by block 1106, in some embodiments, the input signature may include MapAttributes representing one or more level attributes including current level attributes (except surrogate keys). As indicated by block 1108, in some embodiments, the input signature may include MapAttributes representing one or more level attributes including natural key attributes for parent levels. As indicated by 1110, the process flow may loop back to create an input signature for each level. Once an input signature has been generated for each level related to the dimension object, the method 1100 may end.

Figure 12:
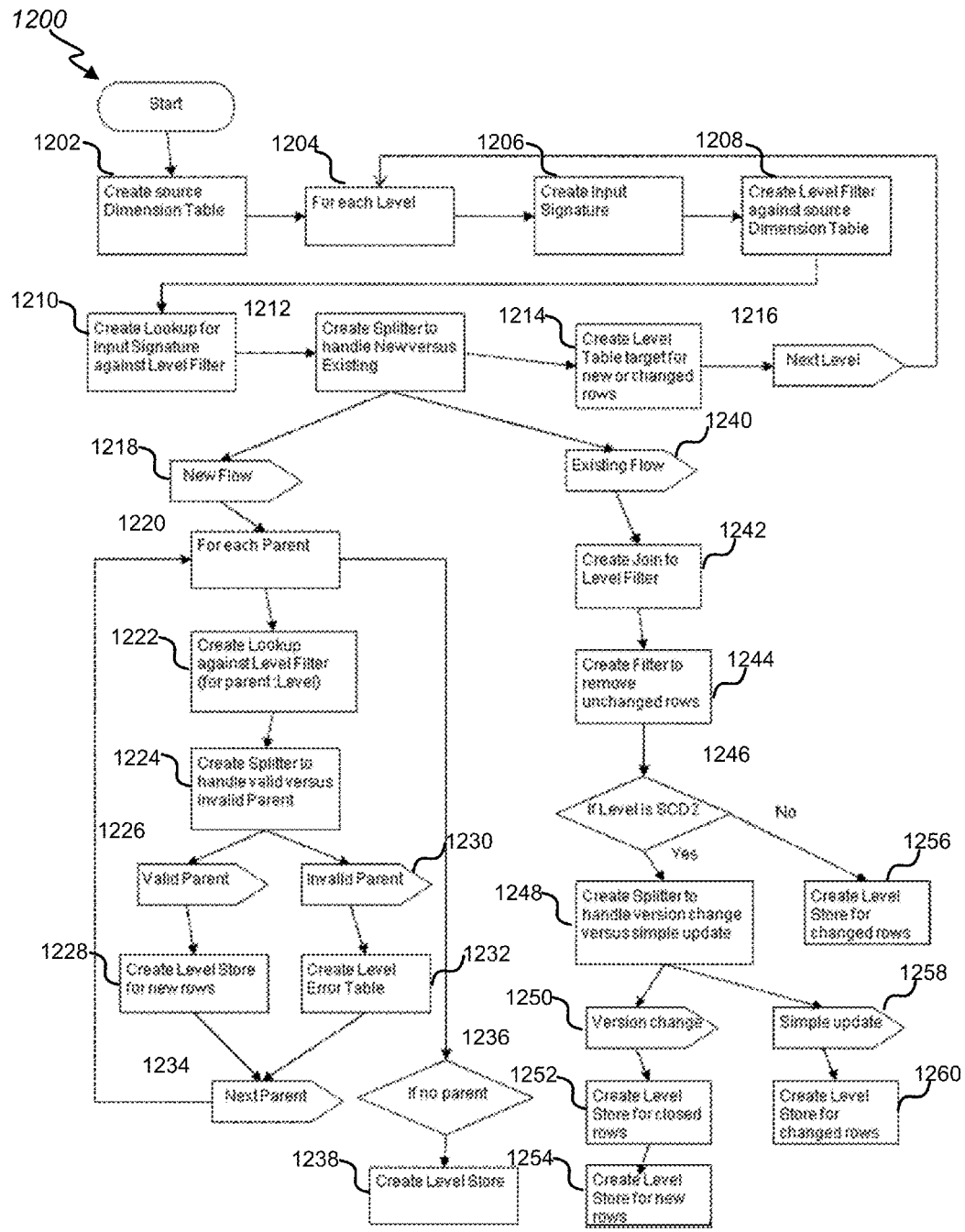
FIG. 12 illustrates an example pattern describing rules for expanding an entity level mapping for a business entity into a data level mapping, in accordance with an embodiment of the present disclosure.

FIG. 12 illustrates an example pattern describing rules for expanding an entity level mapping for a business entity into a data level mapping, in accordance with an embodiment of the present disclosure. As described above, a business level mapping may be transformed into a data level mapping using a pattern. The pattern may manipulate classes for the business entity (e.g., dimension, level, attribute, etc.) and mapping objects (e.g., components of various types, the connections between, etc.). The pattern may include a set of rules (e.g., the pattern logic) for expanding a smart component which encapsulates business rules associated with a given business entity. As such, a given pattern may be business entity-specific.

In the example shown in FIG. 12, method 1200 corresponds to rules for expanding an instance of dimension. As indicated by 1202, a source dimension table may be created. As indicated by 1204 and 1216, each level may be traversed to create an input signature (1206), create a level filter against the source dimension table (1208), create a lookup for input signature against the level filter (1210), create a splitter to handle new versus existing instances (1212), and create a level table target for new or changed rows (1214). As indicated by 1212, it may be determined whether flow should proceed for a new flow 1218 or an existing flow 1240.

In the new flow case, as indicated by 1220 and 1234, each parent may be traversed to create a lookup against level filter for the parent/level (1222), and create a splitter to handle valid versus invalid parent cases (1224). With a valid parent determination (1226), a level store for new rows may be created, as indicated by 1228. With an invalid parent determination (1230), a level error table may be created, as indicated by 1232. As indicated by 1236, it may be determined when this no parent, in which case, a level store may be created, as indicated by 1238.

In the existing flow case, as indicated by 1240, process flow may proceed to create a join to level filter (1242), create a filter to remove unchanged rows (1244), and determine if the level is SCD2 (1246). If it is not a SCD2, a level store for changed rows may be created, as indicated by 1256. In the case of an SCD2, there may be a version change (1250), a level store for closed rows may be created (1252), and a level store for new rows may be created (1254). However, there may be simple update (1258), and a level store for changed rows may be created (1260).

These expansion rules may be associated with the dimension smart component, and may define how to generate one or more data transformations to manipulate the physical data objects which are represented at the business level by the smart component. Although the example shown in FIG. 12 is specific to "dimension," patterns may similarly be defined and associated with other business entities.

Focusing more now on generic editor layout using intrinsic persistence metadata, using the object model 400 illustrated in FIG. 4, an FCO editor (e.g., a dynamically generated GUI for this object model) may be generated, as described below with respect to FIGS. 13A-13D. FIGS. 13A-13D show examples a dynamically generated graphical user interface (GUI), in accordance with an embodiment of the present invention.

Figure 13A:
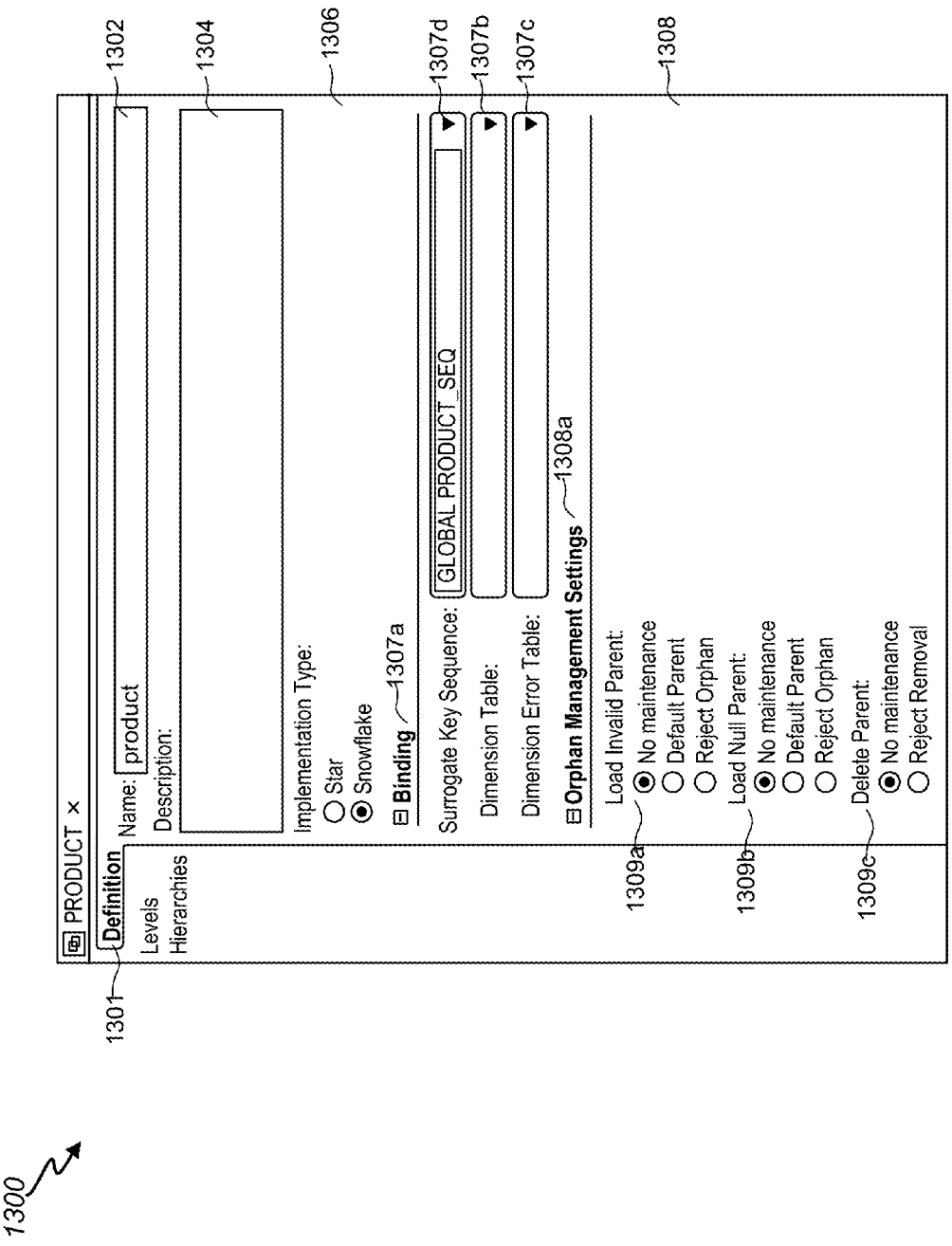

As shown in FIG. 13A, a GUI 1300 generated for the object model 400 illustrated in FIG. 4 may include multiple tabs to represent the objects in the object model. The "Definition" tab 1301 shown as active on GUI 1300 may represent the object model 400 from the perspective of its FCO 402. The "Definition" tab 1301 may include the persistent fields 1302-1208 such as Name 1302, Description 1304, Implementation Type 1306, and Orphan Management Settings 1308 of the FCO 402.

For any primitive field or relationship, the layout of the UI control may be customized to a specific page (e.g., tab) or a specific collapsible heading. A default layout of the UI control may be laid out in the "Definition" tab. In some embodiments, if multiple controls have the same page value, those controls may be laid out in the same tab page, according to the optional order specified. If multiple controls have the same page and heading value, those controls may be laid out in the same tab page under the same collapsible heading. The order value may be global to the controls in the same page.

In addition, for primitive fields, the UI control that may be used to render the field may be customized. A regular UI control may be disabled or hidden, depending on the values of other fields or one-to-one reference relationships within the same editor. The visibility state of the control may be re-evaluated when the value of any primitive field or one-to-one reference relationship is changed. For String fields, either a text field or a text area may be used to render the value in the generic editor. For example, a text field may be used to display name using @GenericLayout (control=ControlType.TEXTFIELD) annotation, while a text area to display description using @GenericLayout (control=ControlType.TEXTAREA) annotation.

For fields that store an enum value, a combo box (dropdown box), radio button, or other control may be used to render the value in the generic editor. For example, a combo box may be used to render a field of enum value. To use radio button instead, the annotation @GenericLayout (control=ControlType.RADIO) may be used.

In a generic editor (e.g., generic GUI), a table control may represent the one-to-many ownership relationship from the first class object 402 to its second class object 404. Since the source class of such table control is the class of the first class object 402 of the editor, the content of the table control may not be driven from other table control. In other cases, if there is a details table control whose source class is the same as the target class of other master table control in the same tab page, the content of the details table control may be driven from the current selection of the master table control. When initializing the generic editor where a table editor model is created for each table control, a selection change event listener may be added to the corresponding master table control such that the content of the details table control may be refreshed. Other regular standalone UI controls (e.g., controls that are not displayed inside a table control) such as text area 1304, text field 1302, dropdown box (combo box) 1307*d* and radio button 1309*a* illustrated in FIG. 13A are also available to modify a primitive field of a target class. Similar algorithm may be used to drive the object that these controls operate on by listening to the selection change event of table control whose target class is the same as the target class of the control. The generic editor may report an error if the source type of table control or target type of other regular control is not the first class object class, but the master table control may not be located in the same page of the editor. This may happen if controls are spread across multiple pages in the generic editor.

Figure 13B:
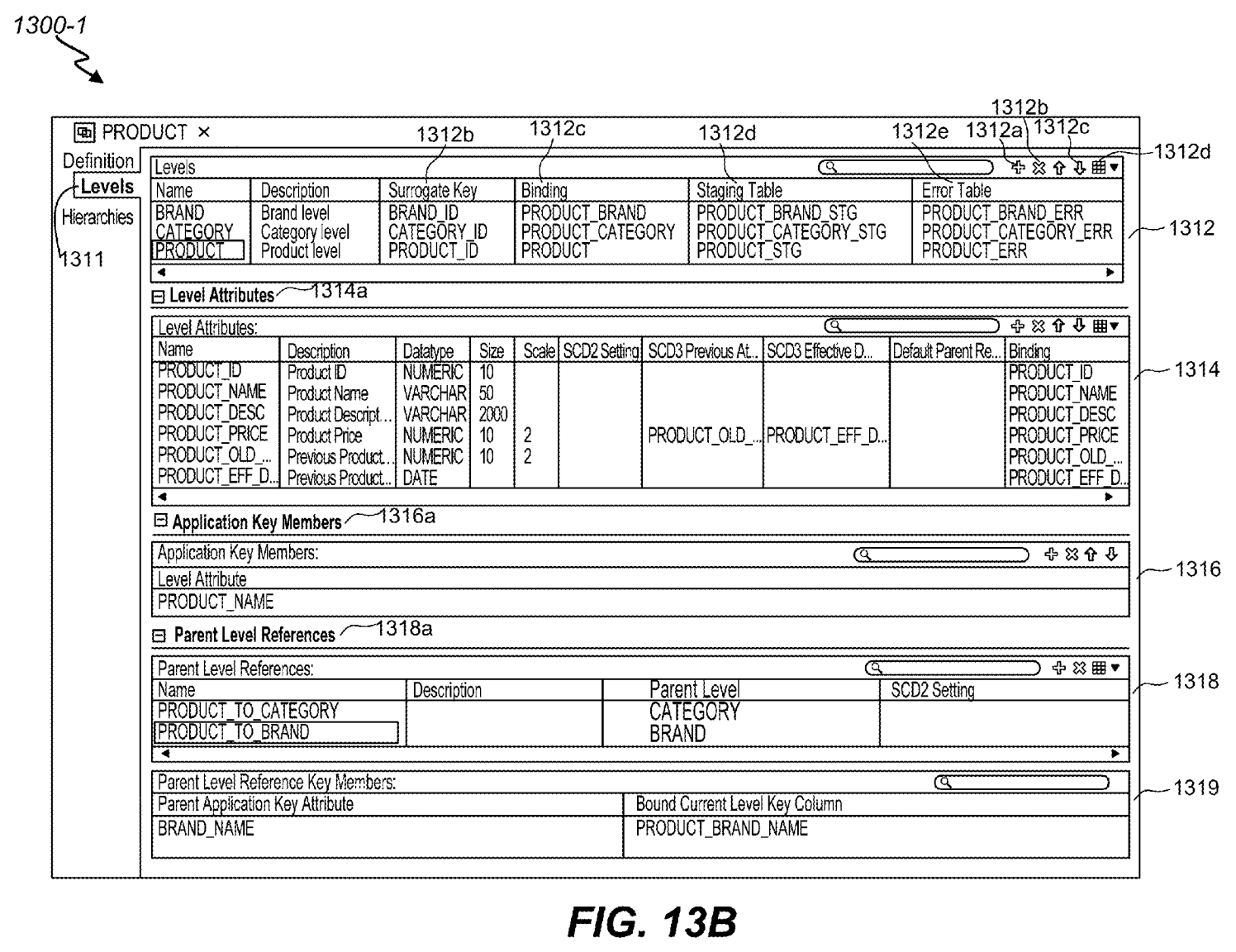

Referring now to FIG. 13B, the second tab 1311 of the GUI 1300 is illustrated. The second tab 1311 may correspond to the SCO 406 of the object model 400 illustrated in FIG. 4. A one-to-many ownership relationship contained in the object model 400 and in the metadata extracted from the object model 400 may be rendered using a table control in the GUI layout. Accordingly, the second tab 1311 illustrated in FIG. 13B shows the one-to-many ownership relationships between FCO 402 to SCO 406, SCO 406 to SCO 410, SCO 406 to SCO 408, SCO 406 to SCO 412 using table controls 1312, 1314, 1316, 1318 respectively, in the SCO tab 1311. One of ordinary skill in the art will appreciate that the relationship between FCO 402 and the multiple SCOs is illustrative and should not be construed as limiting. In some embodiments, there may be a one-to-one ownership relationship between FCO 402 and a given SCO. In other embodiments, FCO 402 may not have any dependent SCOs.

Each table control may be assigned a unique name and may have a source class and a target class. The source represents one-side of the relationship whose object instance owns a collection of child objects of the target class. The column heading and the row content of the table control is supplied through a table model. The list of columns of a table control is provided in a table column model. The table control displays the persistent fields and one-to-one reference relationships of the target class as table columns. If the target class T of the table control TC has one-to-one ownership relationship to another class E, the fields or other one-to-one reference relationship of the class E may be rolled into the table control TC as well.

According to various embodiments, the order of the table controls rendered for the same class of the object model may be reordered. For example, a default order may be used based on how the objects appear on the object model or based on an alphabetical order. In some embodiments, the order can be determined based on annotations. An exemplary annotation @GenericLayout(order=<order number>) may be specified on the one-to-many relationship to change the order of the table controls rendered for the same class of the object model. Embodiments may further enable customizing the order of the table columns in a table control. For a given table control, the table columns may be ordered by default in the same order as in the class of the object model definition. In some embodiments, the order can be customized based on annotations. For example, the annotation @GenericLayout(order=<order number>) may be specified in the class of the object model to change the order of the fields or one-to-one reference relationships within the same class of the object model.

The default column layout of the table control shows all the persistent fields followed by relevant one-to-one-relationships. Fields and relationships of the base class are displayed first. The table model of the table control may be populated with the objects returned for the relationship. If "create" and "remove" actions are available for the one-to-many ownership relationship represented by the table control, the table control may have UI controls such as a add (+) button 1313a and a remove (X) button 1313b in its toolbar to create or remove objects from the collection owned by the object of source class. A default name may be generated by the generic editor if the create method requires a name as an argument. If "reorder" actions are available for the one-to-many ownership relationship represented by the table control, the table control may have UI controls such as up and down arrows 1313c in its toolbar to reorder the selected object in the table control within the collection. If the table column represents a one-to-one reference relationship, a UI control such as a dropdown box 1313d can be shown when editing that table column. If the table column represents a field or a one-to-one reference relationship not owned by the target class of the table control but it is through one-to-one ownership relationship from the target class, the generic editor may first check whether the intermediate parent objects along the path already exists. Some columns in the table control may be disabled or hidden, depending on the values of other fields or one-to-one reference relationships within the same editor. The visibility state of the table column may be re-evaluated when the value of any primitive field or one-to-one reference relationship is changed.

For example, the second class object 406 illustrated in FIG. 4 may be called "level" and illustrated with Level table control 1312 in FIG. 13B. The Level table control 1312 may act as the master table control in the Levels tab 1311. Selection changes in Level table control 1312 may cause the table controls called Level Attributes 1314, Application Key Members 1316 and Parent Level References 1318 to be refreshed with the appropriate content. The persistent fields of the second class object 410, such as Name, Description, Size (Length) and Scale, may be displayed as text columns in the Level Attributes table control 1314. The persistent one-to-one reference relationship from the second class object Level 406 to the second class object Level Attribute 410 may be displayed as one of the columns in the Levels table control 1312, and is a dropdown box on a cell in column 1312b where the applicable level attributes of the level may be selected as its surrogate key.

As provided above, the referenced object of a one-to-one reference relationship may be rendered as a dropdown box in the generic editor (e.g., the generic GUI). The dropdown box may either be in the main editor pane, or is a cell editor in a table control for the column that represents the one-to-one reference relationship. The list of valid values of the dropdown box may be obtained and the list may be used to populate a combo box model for use by the dropdown box. In some embodiments, the current selected value of the dropdown box may be retrieved. In addition, the current selected value of the dropdown box may be modified. For example, when the user selects another value from the dropdown box, the selected value may be set to the underlying object.

As illustrated in FIG. 13B, objects may be created, removed, reordered or listed using UI controls 1313a, 1313b, 1313c, 1313d, respectively. The UI controls 1313a-1213d may be generated based on the metadata associated with the object model. For example, the table control 1316 does not include a list UI control 1313d as the entries in the table control 1316 may not be listed. Similarly, the table control 1318 does not include a reorder UI control 1313c as the entries in the table control 1318 may not be reordered.

For example, the UI control 1313a may be generated based on a naming convention included in the object model. An exemplary naming convention may be a public method with name executeCreateAction_<table control managing the relationship>( ). Alternatively, the UI control 1313a may be generated based on an annotation in the object model or based on an indication incorporated in a configuration file associated with the object model. Using the UI control 1313a, an action may be created for a one-to-many ownership relationship illustrated with a table control.

For example, the UI control 1313b may be generated based on a naming convention included in the object model. An exemplary naming convention may be a public method with name executeRemoveAction_<table control managing the relationship>( ). Alternatively, the UI control 1313b may be generated based on an annotation in the object model or based on an indication incorporated in a configuration file associated with the object model. Using the UI control 1313b, an action may be removed from a one-to-any ownership relationship illustrated with a table control.

For example, the UI control 1313c may be generated based on a naming convention included in the object model. An exemplary naming convention may include two parts: (1) a public method with name executeMoveUpAction_<table control managing the relationship>( ); and (2) a public method with name executeMoveDownAction_<table control managing the relationship>( ). Alternatively, the UI control 1313c may be generated based on an annotation in the object model or based on an indication incorporated in a configuration file associated with the object model. Using the UI control 1313c, objects of a one-to-many relationship may be reordered.

For example, the UI control 1313d may be generated based on a naming convention included in the object model. An exemplary naming convention may be a public method in Level: public List<LevelAttribute>getLevelAttributes( ). Alternatively, the UI control 1313d may be generated based on an annotation in the object model or based on an indication incorporated in a configuration file associated with the object model. Using the UI control 1313d, a list of methods for the one-to-many relationship may be provided.

Figure 13C:
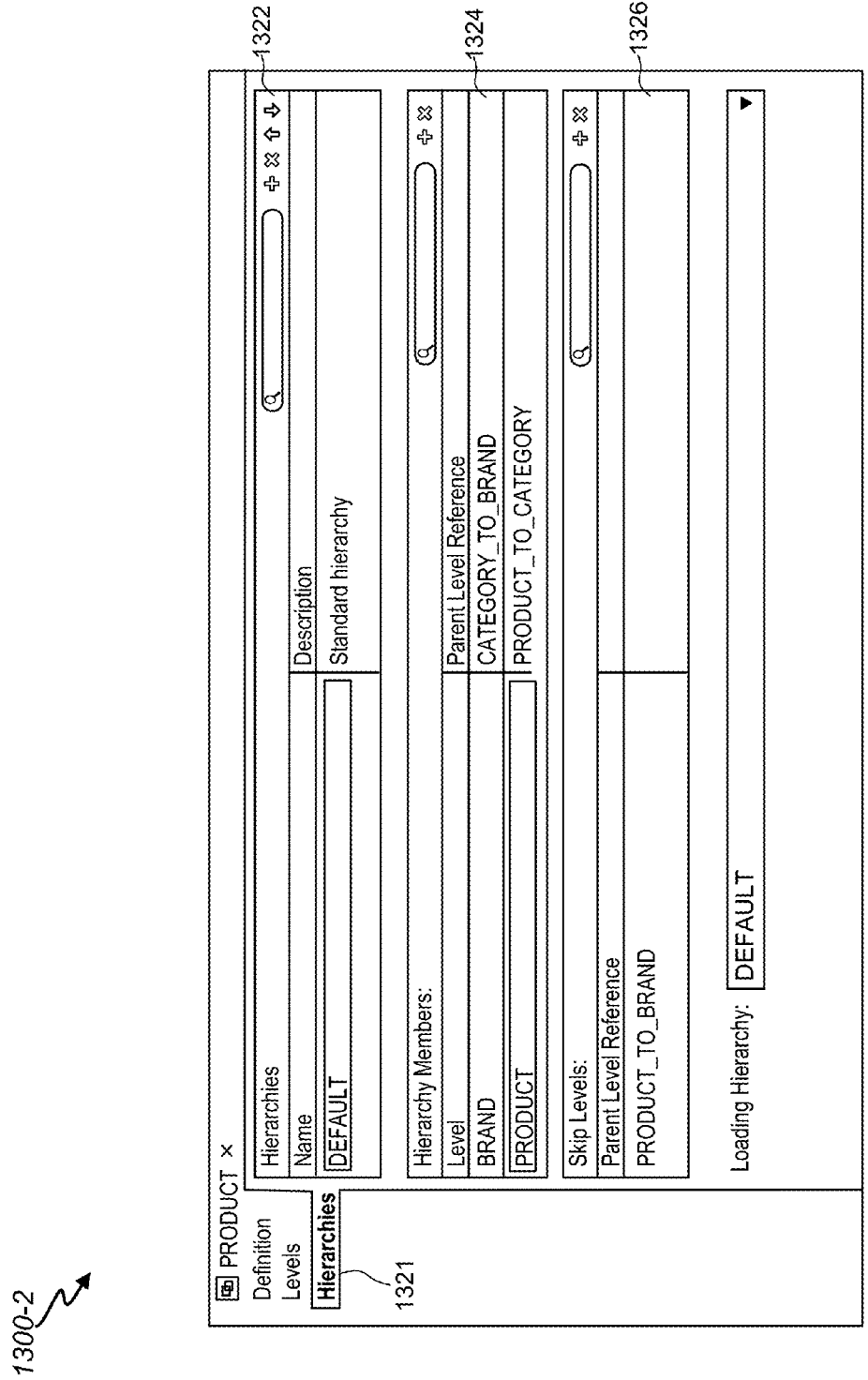

As shown in FIG. 13C, the one-to-many ownership relationships between FCO 402 to SCO 404, and SCO 404 to SCO 412 are displayed as table controls 1322, 1324, 1326, respectively, in the SCO tab 1321. The logic behind the generation of the table controls and UI controls illustrated in FIG. 13C are similar to those discussed in connection with FIG. 13B and thus, is omitted here.

FIG. 13D illustrates a sample configuration file 1340. The sample configuration file may define the layout of the dynamically generated GUI 1300. For example, each tab shown in FIGS. 13A-12C is defined as a separate page 1342, 1344, 1346 on the configuration file 1340. Specifically, the Definition tab 1301 is defined as a first page 1342, the Levels tab 1311 is defined as a second page 1344 and the Hierarchies tab 1321 is defined as a third page 1346. The separate pages also appear under the pages section of the configuration file 1340 as reference numerals 1301, 1311 and 1321 corresponding to tabs 1301, 1311 and 1321, respectively.

Similarly, the UI controls shown in the GUI are also defined in the configuration file 1340. For example, the text field 1302 illustrated in FIG. 13A correspond to line 1302 of the configuration file 1340 and the text area 1304 corresponds to line 1304 of the configuration file 1340. The radio button 1306 illustrated in FIG. 13A correspond to line 1306 of the configuration file 1340. The combo UI controls 1307*b*, 1307*c*, 1307*d* illustrated in FIG. 13A correspond, respectively, to lines 1307*b*, 1307*c*, 1307*d* of the configuration file 1340. The radio button UI controls 1309*a*, 1309*b*, 1309*c* illustrated in FIG. 13A correspond, respectively, to lines 1309*a*, 1309*b*, 1309*c* of the configuration file 1340. The combo UI controls 1312*c*, 1312*e*, 1312*d*, 1312*b* illustrated in FIG. 13B correspond, respectively, to lines 1312*c*, 1312*e*, 1312*d*, 1312*b* of the configuration file 1340.

The tables shown in the GUI are also defined in the configuration file 1340. For example, tables 1312, 1314, 1316, 1318, 1319 illustrated in FIG. 13B correspond, respectively, to lines 1312, 1314, 1316, 1318, 1319 of the configuration file 1340. Tables 1322, 1324, 1326 illustrated in FIG. 13C correspond, respectively, to lines 1322, 1324, 1326 of the configuration file 1340.

The headings shown in the GUI are also defined in the configuration file 1340. For example, headings 1307*a* and 1308*a* illustrated in FIG. 13A correspond, respectively, to lines 1307*a* and 1308*a* of the configuration file 1340. Headings 1314*a*, 1316*a*, 1318*a* illustrated in FIG. 13B correspond, respectively, to lines 1314*a*, 1316*a*, 1318*a* of the configuration file 1340.

In addition, or as an alternative, to the configuration file, a GUI layout may be defined based on annotations included in the code underlying the object model. In various embodiments, the dynamic GUI may be generated using a generic editor framework based on the annotations and/or the configuration file, each editor is initialized with an editor model class which defines the editor layout and UI handlers for metadata retrieval and actions for each first class object. A generic editor model may be created to provide editor layout and metadata manipulation for any objects.

Figure 14:
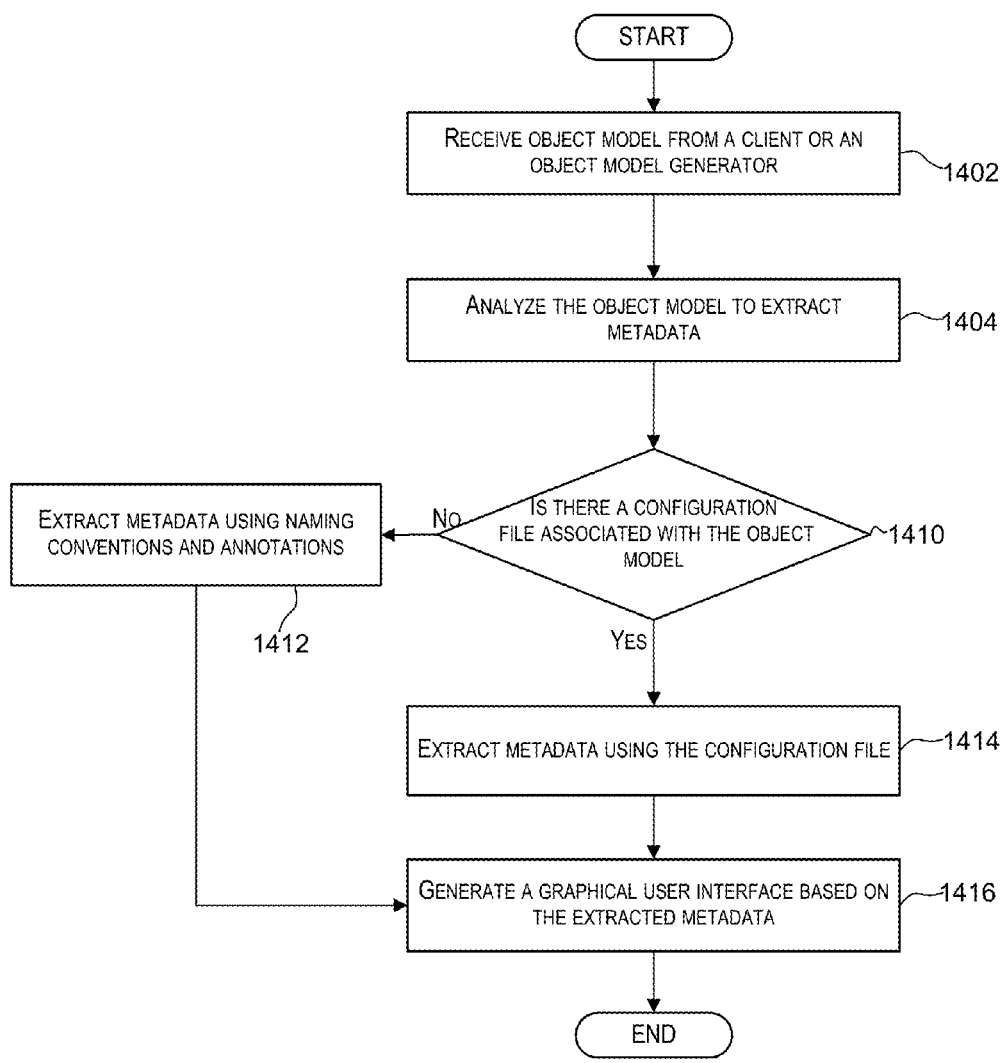
FIG. 14 illustrates method performed by a data integration system for generating a graphical user interface (GUI) for an arbitrary object model, in accordance with an embodiment of the present invention.

FIG. 14 illustrates method 1400 performed by a data integration system for generating a graphical user interface (GUI) for an arbitrary object model, in accordance with an embodiment of the present invention. At step 1402, an object model is received by either a client or an object model generator. For example, a client may provide a user-generated, arbitrary object model to a generic editor framework. Alternatively, the user may provide code to the generic editor framework and an object module generator module of the generic editor framework may generate the object model from the user code. The object model may define a plurality of objects or a one-to-one ownership relationship. The plurality of objects may include a first class object and at least one second class object such that a relationship between the first class object and the at least one second class object is a one-to-many ownership relationship. The plurality of objects may further include at least one second class object associated with the first class object and one or more second class objects associated with the at least one second class object.

At step 1404, a metadata extraction module of the generic editor framework may analyze the object model to extract metadata from the object model. The metadata may describe the plurality of objects of the object model and relationships among the plurality of objects of the object model. In some embodiments, a configuration file may be associated with the object model.

If there is a configuration file associated with the object model ("YES" to step 1410), the metadata extraction module may identify the configuration file associated with the object model and extract the metadata based on data included in the configuration file (step 1414). If the object model is not associated with a configuration file ("NO" to step 1410), the metadata extraction module may identify additional data incorporated within the object model and extract the metadata based on the additional data. The additional data may include naming conventions and annotations used in the object model or the user code representing the object model. In some embodiments, the metadata may include one or more of a plurality of fields storing primitive values, a one-to-many ownership relationship among the plurality of objects, a one-to-one ownership relationship among the plurality of objects, a one-to-one reference relationship among the plurality of objects, and an extension relationship among the plurality of objects.

At step 1416, a GUI generation module of the generic editor framework may dynamically generate a graphical user interface editor for the object model based on the metadata. The GUI generation module may be compatible with a plurality of object models including the received object model. Accordingly, the GUI generation module may generate GUIs for any given object models without foreknowledge of the object model. Once the GUI is generated for an object model, the object model may be manipulated by editing instances of the object model via the GUI.

In some embodiments, the one-to-one reference relationship in the extracted metadata may be rendered as a dropdown box in the GUI. The one-to-many ownership relationship in the extracted metadata may be rendered as a table control in the GUI. Moreover, the metadata may be used to generate user interface controls in the GUI, the user interface controls including a table control, a dropdown box, a textbox, a text field or a radio button. The GUI may also include user interface controls to create, remove or reorder the plurality of objects based on the relationships among the plurality of objects.

In some embodiments, a configuration file may be provided as well as the pre-determined naming convention(s) and/or annotations in the object model. In such embodiments, the configuration file may take precedence. That is, if there is a conflicting information between the data in the configuration file and the data provided by the naming convention and/or annotations, the metadata may be extracted based on the configuration file. The naming convention and the annotations may be used to complement the configuration data. Accordingly, embodiments may extract metadata using the configuration file as well as the pre-determined naming convention and/or the annotations.

Figure 15:
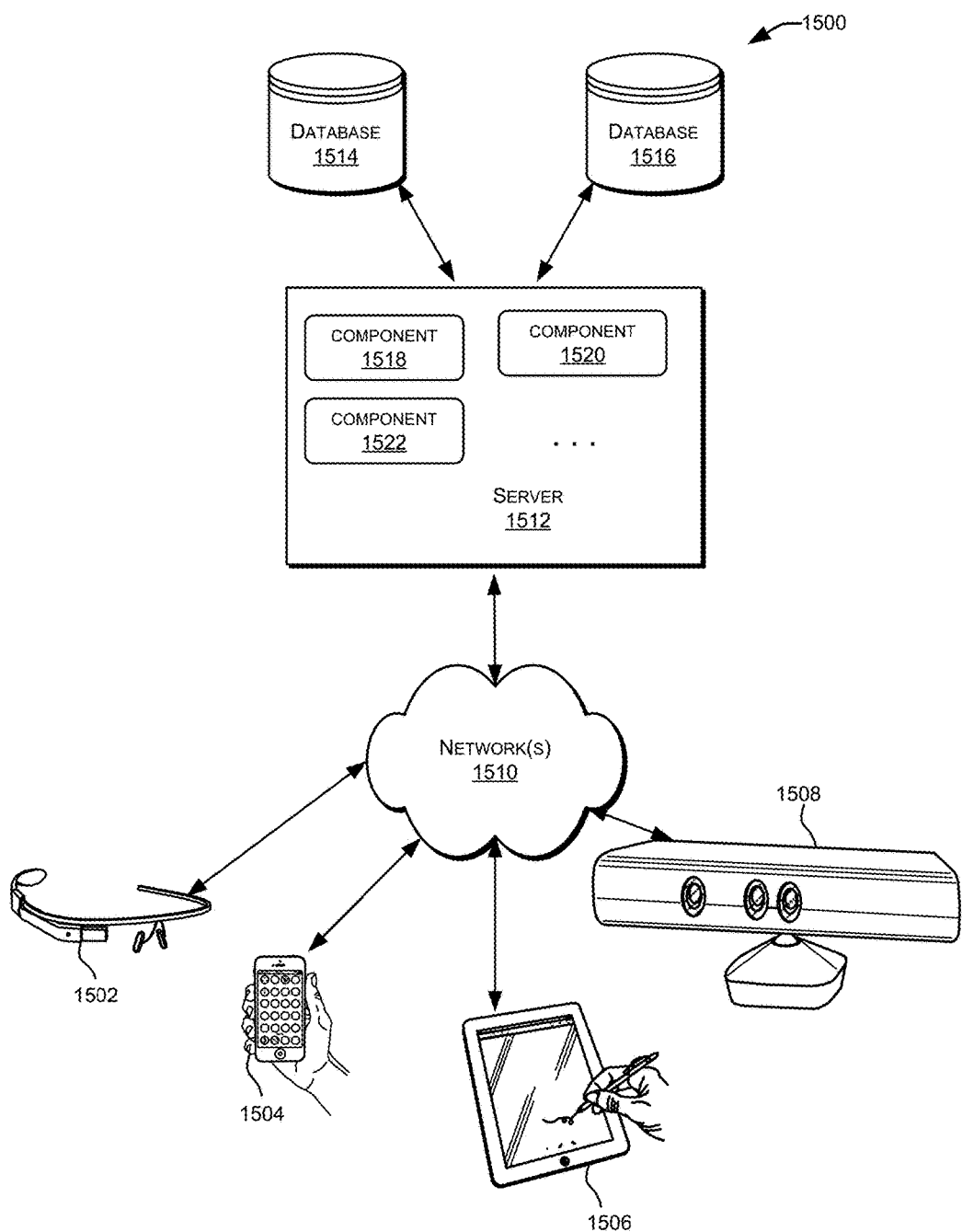
FIG. 15 depicts a simplified diagram of a distributed system for implementing one of the embodiments.

FIG. 15 depicts a simplified diagram of a distributed system 1500 for implementing one of the embodiments. In the illustrated embodiment, distributed system 1500 includes one or more client computing devices 1502, 1504, 1506, and 1508, which are configured to execute and operate a client application such as a web browser, proprietary client (e.g., Oracle Forms), or the like over one or more network(s) 1510. Server 1512 may be communicatively coupled with remote client computing devices 1502, 1504, 1506, and 1508 via network 1510.

In various embodiments, server 1512 may be adapted to run one or more services or software applications provided by one or more of the components of the system. In some embodiments, these services may be offered as web-based or cloud services or under a Software as a Service (SaaS) model to the users of client computing devices 1502, 1504, 1506, and/or 1508. Users operating client computing devices 1502, 1504, 1506, and/or 1508 may in turn utilize one or more client applications to interact with server 1512 to utilize the services provided by these components.

In the configuration depicted in the figure, the software components 1518, 1520 and 1522 of system 1500 are shown as being implemented on server 1512. In other embodiments, one or more of the components of system 1500 and/or the services provided by these components may also be implemented by one or more of the client computing devices 1502, 1504, 1506, and/or 1508. Users operating the client computing devices may then utilize one or more client applications to use the services provided by these components. These components may be implemented in hardware, firmware, software, or combinations thereof. It should be appreciated that various different system configurations are possible, which may be different from distributed system 1500. The embodiment shown in the figure is thus one example of a distributed system for implementing an embodiment system and is not intended to be limiting.

Client computing devices 1502, 1504, 1506, and/or 1508 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 15, Palm OS, and the like, and being Internet, e-mail, short message service (SMS), Blackberry®, or other communication protocol enabled. The client computing devices may be general purpose personal computers including, by way of example, personal computers and/or laptop computers running various versions of Microsoft Windows®, Apple Macintosh®, and/or Linux operating systems. The client computing devices may be workstation computers running any of a variety of commercially-available UNIX® or UNIX-like operating systems, including without limitation the variety of GNU/Linux operating systems, such as for example, Google Chrome OS. Alternatively, or in addition, client computing devices 1502, 1504, 1506, and 1508 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1510.

Although exemplary distributed system 1500 is shown with four client computing devices, any number of client computing devices may be supported. Other devices, such as devices with sensors, etc., may interact with server 1512.

Network(s) 1510 in distributed system 1500 may be any type of network familiar to those skilled in the art that may support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1510 may be a local area network (LAN), such as one based on Ethernet, Token-Ring and/or the like. Network(s) 1510 may be a wide-area network and the Internet. It may include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1512 may be adapted to run one or more services or software applications described in the foregoing disclosure. For example, server 1512 may correspond to a server for performing processing described above according to an embodiment of the present disclosure.

Server 1512 may run an operating system including any of those discussed above, as well as any commercially available server operating system. Server 1512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1512 may include one or more applications to analyze and consolidate data feeds and/or event updates received from users of client computing devices 1502, 1504, 1506, and 1508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1512 may also include one or more applications to display the data feeds and/or real-time events via one or more display devices of client computing devices 1502, 1504, 1506, and 1508.

Distributed system 1500 may also include one or more databases 1514 and 1516. Databases 1514 and 1516 may reside in a variety of locations. By way of example, one or more of databases 1514 and 1516 may reside on a non-transitory storage medium local to (and/or resident in) server 1512. Alternatively, databases 1514 and 1516 may be remote from server 1512 and in communication with server 1512 via a network-based or dedicated connection. In one set of embodiments, databases 1514 and 1516 may reside in a storage-area network (SAN). Similarly, any necessary files for performing the functions attributed to server 1512 may be stored locally on server 1512 and/or remotely, as appropriate. In one set of embodiments, databases 1514 and 1516 may include relational databases, such as databases provided by Oracle, that are adapted to store, update, and retrieve data in response to SQL-formatted commands.

FIG. 15 is a simplified block diagram of one or more components of a system environment 1600 by which services provided by one or more components of an embodiment system may be offered as cloud services, in accordance with an embodiment of the present disclosure. In the illustrated embodiment, system environment 1600 includes one or more client computing devices 1604, 1606, and 1608 that may be used by users to interact with a cloud infrastructure system 1602 that provides cloud services. The client computing devices may be configured to operate a client application such as a web browser, a proprietary client application (e.g., Oracle Forms), or some other application, which may be used by a user of the client computing device to interact with cloud infrastructure system 1602 to use services provided by cloud infrastructure system 1602.

It should be appreciated that cloud infrastructure system 1602 depicted in the figure may have other components than those depicted. Further, the embodiment shown in the figure is only one example of a cloud infrastructure system that may incorporate an embodiment of the disclosure. In some other embodiments, cloud infrastructure system 1602 may have more or fewer components than shown in the figure, may combine two or more components, or may have a different configuration or arrangement of components.

Client computing devices 1604, 1606, and 1608 may be devices similar to those described above for 1502, 1504, 1506, and 1508.

Although exemplary system environment 1600 is shown with three client computing devices, any number of client computing devices may be supported. Other devices such as devices with sensors, etc. may interact with cloud infrastructure system 1602.

Network(s) 1610 may facilitate communications and exchange of data between clients 1604, 1606, and 1608 and cloud infrastructure system 1602. Each network may be any type of network familiar to those skilled in the art that may support data communications using any of a variety of commercially-available protocols, including those described above for network(s) 1510.

Cloud infrastructure system 1602 may comprise one or more computers and/or servers that may include those described above for server 1512.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system may dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service may include password-protected access to remote storage on the cloud through the Internet. As another example, a service may include a web service-based hosted relational database and a script-language middleware engine for private use by a networked developer. As another example, a service may include access to an email software application hosted on a cloud vendor's web site.

In certain embodiments, cloud infrastructure system 1602 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1602 may be adapted to automatically provision, manage and track a customer's subscription to services offered by cloud infrastructure system 1602. Cloud infrastructure system 1602 may provide the cloud services via different deployment models. For example, services may be provided under a public cloud model in which cloud infrastructure system 1602 is owned by an organization selling cloud services (e.g., owned by Oracle) and the services are made available to the general public or different industry enterprises. As another example, services may be provided under a private cloud model in which cloud infrastructure system 1602 is operated solely for a single organization and may provide services for one or more entities within the organization. The cloud services may also be provided under a community cloud model in which cloud infrastructure system 1602 and the services provided by cloud infrastructure system 1602 are shared by several organizations in a related community. The cloud services may also be provided under a hybrid cloud model, which is a combination of two or more different models.

In some embodiments, the services provided by cloud infrastructure system 1602 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1602. Cloud infrastructure system 1602 then performs processing to provide the services in the customer's subscription order.

In some embodiments, the services provided by cloud infrastructure system 1602 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers may utilize applications executing on the cloud infrastructure system. Customers may acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers may acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers may employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1602 may also include infrastructure resources 1630 for providing the resources used to provide various services to customers of the cloud infrastructure system. In one embodiment, infrastructure resources 1630 may include pre-integrated and optimized combinations of hardware, such as servers, storage, and networking resources to execute the services provided by the PaaS platform and the SaaS platform.

In some embodiments, resources in cloud infrastructure system 1602 may be shared by multiple users and dynamically re-allocated per demand. Additionally, resources may be allocated to users in different time zones. For example, cloud infrastructure system 1630 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1632 may be provided that are shared by different components or modules of cloud infrastructure system 1602 and by the services provided by cloud infrastructure system 1602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1602 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1602, and the like.

In one embodiment, as depicted in the figure, cloud management functionality may be provided by one or more modules, such as an order management module 1620, an order orchestration module 1622, an order provisioning module 1624, an order management and monitoring module 1626, and an identity management module 1628. These modules may include or be provided using one or more computers and/or servers, which may be general purpose computers, specialized server computers, server farms, server clusters, or any other appropriate arrangement and/or combination.

In exemplary operation 1634, a customer using a client device, such as client device 1604, 1606 or 1608, may interact with cloud infrastructure system 1602 by requesting one or more services provided by cloud infrastructure system 1602 and placing an order for a subscription for one or more services offered by cloud infrastructure system 1602. In certain embodiments, the customer may access a cloud User Interface (UI), cloud UI 1612, cloud UI 1614 and/or cloud UI 1616 and place a subscription order via these UIs. The order information received by cloud infrastructure system 1602 in response to the customer placing an order may include information identifying the customer and one or more services offered by the cloud infrastructure system 1602 that the customer intends to subscribe to.

After an order has been placed by the customer, the order information is received via the cloud UIs, 1612, 1614 and/or 1616.

At operation 1636, the order is stored in order database 1618. Order database 1618 may be one of several databases operated by cloud infrastructure system 1618 and operated in conjunction with other system elements.

At operation 1638, the order information is forwarded to an order management module 1620. In some instances, order management module 1620 may be configured to perform billing and accounting functions related to the order, such as verifying the order, and upon verification, booking the order.

At operation 1640, information regarding the order is communicated to an order orchestration module 1622. Order orchestration module 1622 may utilize the order information to orchestrate the provisioning of services and resources for the order placed by the customer. In some instances, order orchestration module 1622 may orchestrate the provisioning of resources to support the subscribed services using the services of order provisioning module 1624.

In certain embodiments, order orchestration module 1622 enables the management of business processes associated with each order and applies business logic to determine whether an order should proceed to provisioning. At operation 1642, upon receiving an order for a new subscription, order orchestration module 1622 sends a request to order provisioning module 1624 to allocate resources and configure those resources needed to fulfill the subscription order. Order provisioning module 1624 enables the allocation of resources for the services ordered by the customer. Order provisioning module 1624 provides a level of abstraction between the cloud services provided by cloud infrastructure system 1600 and the physical implementation layer that is used to provision the resources for providing the requested services. Order orchestration module 1622 may thus be isolated from implementation details, such as whether or not services and resources are actually provisioned on the fly or pre-provisioned and only allocated/assigned upon request.

At operation 1644, once the services and resources are provisioned, a notification of the provided service may be sent to customers on client devices 1604, 1606 and/or 1608 by order provisioning module 1624 of cloud infrastructure system 1602.

At operation 1646, the customer's subscription order may be managed and tracked by an order management and monitoring module 1626. In some instances, order management and monitoring module 1626 may be configured to collect usage statistics for the services in the subscription order, such as the amount of storage used, the amount data transferred, the number of users, and the amount of system up time and system down time.

In certain embodiments, cloud infrastructure system 1600 may include an identity management module 1628. Identity management module 1628 may be configured to provide identity services, such as access management and authorization services in cloud infrastructure system 1600. In some embodiments, identity management module 1628 may control information about customers who wish to utilize the services provided by cloud infrastructure system 1602. Such information may include information that authenticates the identities of such customers and information that describes which actions those customers are authorized to perform relative to various system resources (e.g., files, directories, applications, communication ports, memory segments, etc.) Identity management module 1628 may also include the management of descriptive information about each customer and about how and by whom that descriptive information may be accessed and modified.

Figure 16:
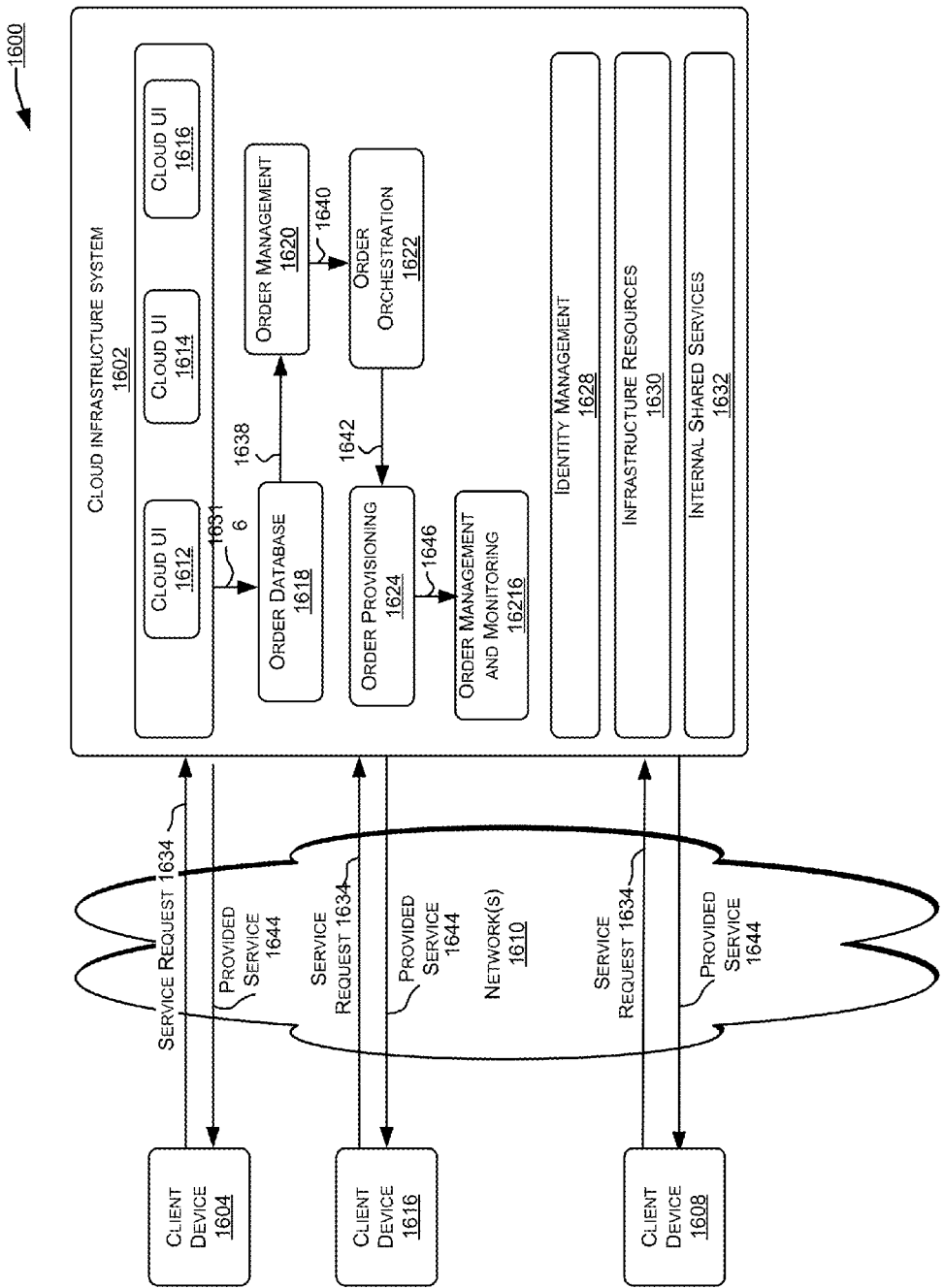
FIG. 16 is a simplified block diagram of components of a system environment by which services provided by the components of an embodiment system may be offered as cloud services, in accordance with an embodiment of the present disclosure.
Figure 17:
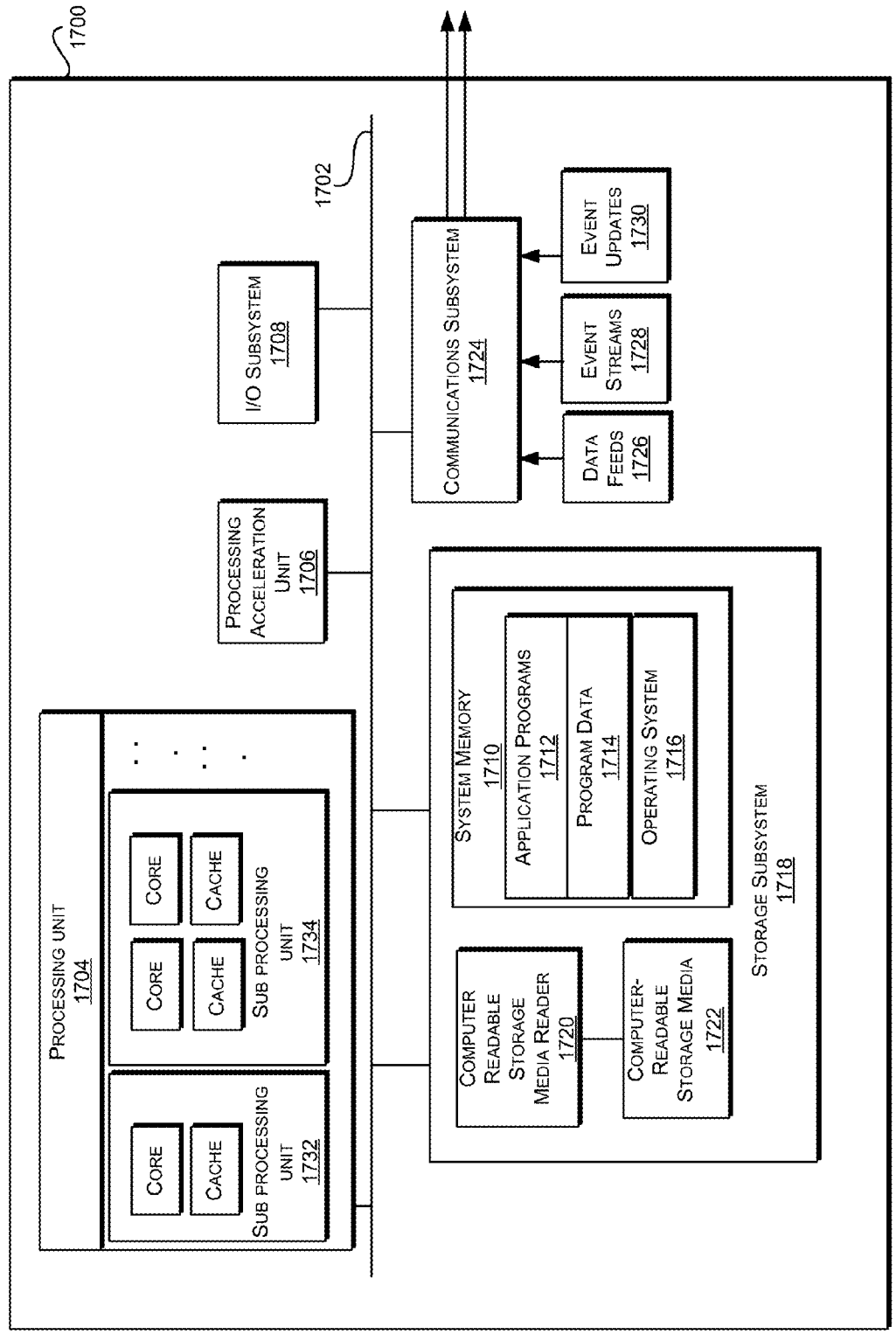
FIG. 17 illustrates an exemplary computer system, in which various embodiments of the present disclosure may be implemented.

FIG. 16 illustrates an exemplary computer system 1700, in which various embodiments of the present disclosure may be implemented. The system 1700 may be used to implement any of the computer systems described above. As shown in the figure, computer system 1700 includes a processing unit 1704 that communicates with a number of peripheral subsystems via a bus subsystem 1702. These peripheral subsystems may include a processing acceleration unit 1706, an I/O subsystem 1708, a storage subsystem 1718 and a communications subsystem 1724. Storage subsystem 1718 includes tangible computer-readable storage media 1722 and a system memory 1710.

Bus subsystem 1702 provides a mechanism for letting the various components and subsystems of computer system 1700 communicate with each other as intended. Although bus subsystem 1702 is shown schematically as a single bus, alternative embodiments of the bus subsystem may utilize multiple buses. Bus subsystem 1702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard.

Processing unit 1704, which may be implemented as one or more integrated circuits (e.g., a conventional microprocessor or microcontroller), controls the operation of computer system 1700. One or more processors may be included in processing unit 1704. These processors may include single core or multicore processors. In certain embodiments, processing unit 1704 may be implemented as one or more independent processing units 1732 and/or 1734 with single or multicore processors included in each processing unit. In other embodiments, processing unit 1704 may also be implemented as a quad-core processing unit formed by integrating two dual-core processors into a single chip.

In various embodiments, processing unit 1704 may execute a variety of programs in response to program code and may maintain multiple concurrently executing programs or processes. At any given time, some or all of the program code to be executed may be resident in processor(s) 1704 and/or in storage subsystem 1718. Through suitable programming, processor(s) 1704 may provide various functionalities described above. Computer system 1700 may additionally include a processing acceleration unit 1706, which may include a digital signal processor (DSP), a special-purpose processor, and/or the like.

I/O subsystem 1708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 1560 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 15D scanners, 15D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1700 may comprise a storage subsystem 1718 that comprises software elements, shown as being currently located within a system memory 1710. System memory 1710 may store program instructions that are loadable and executable on processing unit 1704, as well as data generated during the execution of these programs.

Depending on the configuration and type of computer system 1700, system memory 1710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1704. In some implementations, system memory 1710 may include multiple different types of memory, such as static random access memory (SRAM) or dynamic random access memory (DRAM). In some implementations, a basic input/output system (BIOS), containing the basic routines that help to transfer information between elements within computer system 1700, such as during start-up, may typically be stored in the ROM. By way of example, and not limitation, system memory 1710 also illustrates application programs 1712, which may include client applications, Web browsers, mid-tier applications, relational database management systems (RDBMS), etc., program data 1714, and an operating system 1716. By way of example, operating system 1716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 8 OS, and Palm® OS operating systems.

Storage subsystem 1718 may also provide a tangible computer-readable storage medium for storing the basic programming and data constructs that provide the functionality of some embodiments. Software (programs, code modules, instructions) that when executed by a processor provide the functionality described above may be stored in storage subsystem 1718. These software modules or instructions may be executed by processing unit 1704. Storage subsystem 1718 may also provide a repository for storing data used in accordance with the present disclosure.

Storage subsystem 1700 may also include a computer-readable storage media reader 1720 that may further be connected to computer-readable storage media 1722. Together and, optionally, in combination with system memory 1710, computer-readable storage media 1722 may comprehensively represent remote, local, fixed, and/or removable storage devices plus storage media for temporarily and/or more permanently containing, storing, transmitting, and retrieving computer-readable information.

Computer-readable storage media 1722 containing code, or portions of code, may also include any appropriate media known or used in the art, including storage media and communication media, such as but not limited to, volatile and non-volatile, removable and non-removable media implemented in any method or technology for storage and/or transmission of information. This may include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This may also include nontangible computer-readable media, such as data signals, data transmissions, or any other medium which may be used to transmit the desired information and which may be accessed by computing system 1700.

By way of example, computer-readable storage media 1722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1722 may include, but is not limited to, Zip® drives, flash memory cards, universal serial bus (USB) flash drives, secure digital (SD) cards, DVD disks, digital video tape, and the like. Computer-readable storage media 1722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1700.

Communications subsystem 1724 provides an interface to other computer systems and networks. Communications subsystem 1724 serves as an interface for receiving data from and transmitting data to other systems from computer system 1700. For example, communications subsystem 1724 may enable computer system 1700 to connect to one or more devices via the Internet. In some embodiments communications subsystem 1724 may include radio frequency (RF) transceiver components for accessing wireless voice and/or data networks (e.g., using cellular telephone technology, advanced data network technology, such as 15G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1724 may provide wired network connectivity (e.g., Ethernet) in addition to or instead of a wireless interface.

In some embodiments, communications subsystem 1724 may also receive input communication in the form of structured and/or unstructured data feeds 1726, event streams 1728, event updates 1730, and the like on behalf of one or more users who may use computer system 1700.

By way of example, communications subsystem 1724 may be configured to receive data feeds 1726 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1724 may also be configured to receive data in the form of continuous data streams, which may include event streams 1728 of real-time events and/or event updates 1730, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1724 may also be configured to output the structured and/or unstructured data feeds 1726, event streams 1728, event updates 1730, and the like to one or more databases that may be in communication with one or more streaming data source computers coupled to computer system 1700.

Computer system 1700 may be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art may appreciate other ways and/or methods to implement the various embodiments.

In the foregoing specification, aspects of the disclosure are described with reference to specific embodiments thereof, but those skilled in the art may recognize that the disclosure is not limited thereto. Various features and aspects of the above-described disclosure may be used individually or jointly. Further, embodiments may be utilized in any number of environments and applications beyond those described herein without departing from the broader spirit and scope of the specification. The specification and drawings are, accordingly, to be regarded as illustrative rather than restrictive.

What is claimed is:

1. A method comprising:
   processing an object model received by a data-processing system, the object model defining a plurality of objects and a first set of rules governing relationships among the plurality of objects;
   analyzing by the data-processing system the object model to:
      determine a first set of metadata from the object model, wherein the first set of metadata specifies the plurality of objects in the object model and the first set of rules governing relationships among the plurality of objects; and
      determine a second set of metadata that specifies instantiations of objects of the plurality of objects in one or more data structures and a second set of rules governing the objects in the one or more data structures;
      where one or both of the first set of metadata and the second set of metadata are determined at least partially by determining whether a configuration file is associated with the object model, wherein, when a configuration file is not determined to be associated with the object model, one or both of the first set of metadata and the second set of metadata are extracted from the object model based at least in part on additional data incorporated within the object model;
   based at least in part on the first set of metadata and the second set of metadata, dynamically generating by the data-processing system code to facilitate a representation of the object model in a mapping with a smart component, the smart component configured to persist and to manipulate the instantiations of objects of the plurality of objects in the one or more data structures based at least in part on the second set of rules governing the objects in the one or more data structures; and
   based at least in part on the first set of metadata, dynamically generating a graphical user interface editor for the object model, and manipulating the object model by editing instances of the object model responsive to input received via the graphical user interface editor.

2. The method of claim 1, further comprising:
   generating services for the object model, the services comprising one or more of a set of tables, one or more class definitions, one or more class relationships, and/or one or more application programming interfaces;
   wherein the smart component is to use the services to persist and to manipulate the instantiations of objects of the plurality of objects in the one or more data structures.

3. The method of claim 1, further comprising:
   representing the object model as the smart component based at least in part on at least one pattern definition associated with the object model, wherein the at least one pattern definition defines one or more mapping expansion rules for expanding the mapping of the object model.

4. The method of claim 3, wherein the at least one pattern definition further includes one or more expansion rules associated with the smart component, wherein the one or more expansion rules define how to generate one or more data transformations to manipulate the instantiations of objects of the plurality of objects in the one or more data structures.

5. The method of claim 1, further comprising:
   processing user input received based at least in part on the graphical user interface editor for the object model, wherein the user input indicates a change to the object model;
   wherein the smart component manipulates the instantiations of objects of the plurality of objects in the one or more data structures based at least in part on the user input.

6. The method of claim 5, wherein the smart component manipulates the instantiations of objects of the plurality of objects in the one or more data structures based at least in part on one or more mapping expansion rules for expanding the mapping of the object model.

7. The method of claim 1, wherein, when a configuration file is determined to be associated with the object model, extracting one or both of the first set of metadata and the second set of metadata from the object model based at least in part on data in the configuration file associated with the object model.

8. One or more non-transitory, processor-readable media storing instructions that, when executed by a data-processing system, cause the data-processing system to:
   process an object model received by the data-processing system, the object model defining a plurality of objects and a first set of rules governing relationships among the plurality of objects;
   analyze the object model to:
      determine a first set of metadata from the object model, wherein the first set of metadata specifies the plurality of objects in the object model and the first set of rules governing relationships among the plurality of objects; and
      determine a second set of metadata that specifies instantiations of objects of the plurality of objects in one or more data structures and a second set of rules governing the objects in the one or more data structures;

where one or both of the first set of metadata and the second set of metadata are determined at least partially by determining whether a configuration file is associated with the object model, wherein, when a configuration file is not determined to be associated with the object model, one or both of the first set of metadata and the second set of metadata are extracted from the object model based at least in part on additional data incorporated within the object model;

based at least in part on the first set of metadata and the second set of metadata, dynamically generate code to facilitate a representation of the object model in a mapping with a smart component, the smart component configured to persist and to manipulate the instantiations of objects of the plurality of objects in the one or more data structures based at least in part on the second set of rules governing the objects in the one or more data structures; and based at least in part on the first set of metadata, dynamically generating a graphical user interface editor for the object model, and manipulating the object model by editing instances of the object model responsive to input received via the graphical user interface editor.

9. The one or more non-transitory, processor-readable media of claim 8, wherein the instructions further cause the data-processing system to:

generate services for the object model, the services comprising one or more of a set of tables, one or more class definitions, one or more class relationships, and/or one or more application programming interfaces;

wherein the smart component is to use the services to persist and to manipulate the instantiations of objects of the plurality of objects in the one or more data structures.

10. The one or more non-transitory, processor-readable media of claim 8, wherein the instructions further cause the data-processing system to:

represent the object model as the smart component based at least in part on at least one pattern definition associated with the object model, wherein the at least one pattern definition defines one or more mapping expansion rules for expanding the mapping of the object model.

11. The one or more non-transitory, processor-readable media of claim 10, wherein the at least one pattern definition further includes one or more expansion rules associated with the smart component, wherein the one or more expansion rules define how to generate one or more data transformations to manipulate the instantiations of objects of the plurality of objects in the one or more data structures.

12. The one or more non-transitory, processor-readable media of claim 8, wherein the instructions further cause the data-processing system to:

process user input received based at least in part on the graphical user interface editor for the object model, wherein the user input indicates a change to the object model;

wherein the smart component manipulates the instantiations of objects of the plurality of objects in the one or more data structures based at least in part on the user input.

13. The one or more non-transitory, processor-readable media of claim 12, wherein the smart component manipulates the instantiations of objects of the plurality of objects in the one or more data structures based at least in part on one or more mapping expansion rules for expanding the mapping of the object model.

14. A system comprising:

a data-processing system comprising one or more processors communicatively coupled to a data store, the data-processing system further comprising memory coupled to the one or more processors and storing instructions that, when executed by the one or more processors, cause the data-processing system to:

process an object model received by the data-processing system, the object model defining a plurality of objects and a first set of rules governing relationships among the plurality of objects;

analyze the object model to:

determine a first set of metadata from the object model, wherein the first set of metadata specifies the plurality of objects in the object model and the first set of rules governing relationships among the plurality of objects; and determine a second set of metadata that specifies instantiations of objects of the plurality of objects in one or more data structures and a second set of rules governing the objects in the one or more data structures;

where one or both of the first set of metadata and the second set of metadata are determined at least partially by determining whether a configuration file is associated with the object model, wherein, when a configuration file is not determined to be associated with the object model, one or both of the first set of metadata and the second set of metadata are extracted from the object model based at least in part on additional data incorporated within the object model;

based at least in part on the first set of metadata and the second set of metadata, dynamically generate code to facilitate a representation of the object model in a mapping with a smart component, the smart component configured to persist and to manipulate the instantiations of objects of the plurality of objects in the one or more data structures based at least in part on the second set of rules governing the objects in the one or more data structures; and based at least in part on the first set of metadata, dynamically generating a graphical user interface editor for the object model, and manipulating the object model by editing instances of the object model responsive to input received via the graphical user interface editor.

15. The system of claim 14, wherein the instructions further cause the data-processing system to:

generate services for the object model, the services comprising one or more of a set of tables, one or more class definitions, one or more class relationships, and/or one or more application programming interfaces;

wherein the smart component is to use the services to persist and to manipulate the instantiations of objects of the plurality of objects in the one or more data structures.

16. The system of claim 14, wherein the instructions further cause the data-processing system to:

represent the object model as the smart component based at least in part on at least one pattern definition associated with the object model, wherein the at least one pattern definition defines one or more mapping expansion rules for expanding the mapping of the object model.

17. The system of claim 16, wherein the at least one pattern definition further includes one or more expansion rules associated with the smart component, wherein the one or more expansion rules define how to generate one or more data transformations to manipulate the instantiations of objects of the plurality of objects in the one or more data structures.

18. The system of claim 14, wherein the instructions further cause the data-processing system to:
- process user input received based at least in part on the graphical user interface editor for the object model, wherein the user input indicates a change to the object model;
- wherein the smart component manipulates the instantiations of objects of the plurality of objects in the one or more data structures based at least in part on the user input.

* * * * *